United States Patent [19]

Hiramatsu et al.

[11] Patent Number: 5,280,356
[45] Date of Patent: Jan. 18, 1994

[54] CLAMP CIRCUIT FOR CLAMPING VIDEO SIGNAL INCLUDING SYNCHRONIZING SIGNAL AT A PRESCRIBED POTENTIAL

[75] Inventors: Yonejiro Hiramatsu, Mitaka; Osamu Sakatsuji, Abiko, both of Japan

[73] Assignee: Sharp Kabushiki Kaisha, Osaka, Japan

[21] Appl. No.: 944,095

[22] Filed: Sep. 11, 1992

[30] Foreign Application Priority Data

Sep. 12, 1991 [JP] Japan .................. 3-233101
Jul. 22, 1992 [JP] Japan .................. 4-195625

[51] Int. Cl.$^5$ .................. H04N 5/16; H04N 5/18; H04N 9/72; H04N 5/08
[52] U.S. Cl. .................. 358/171; 358/172; 358/34; 358/153
[58] Field of Search .................. 358/171, 172, 173, 34, 358/174, 153

[56] References Cited

U.S. PATENT DOCUMENTS

| | | | |
|---|---|---|---|
| 4,064,541 | 12/1977 | Schneider et al. | 358/153 |
| 4,369,466 | 1/1983 | Matsuzaki et al. | 358/171 |
| 4,403,251 | 9/1983 | Okada et al. | 358/171 |
| 4,707,741 | 11/1987 | Stratton | 358/171 |
| 4,860,099 | 8/1989 | Kuwajima | 358/171 |
| 5,057,920 | 10/1991 | Wilkinson | 358/172 |
| 5,105,272 | 4/1992 | Kanai | 358/153 |
| 5,105,276 | 4/1992 | Schrock | 358/171 X |
| 5,140,421 | 8/1992 | Sumiyoshi | 358/172 |
| 5,142,354 | 8/1992 | Suzuki et al. | 358/34 |

FOREIGN PATENT DOCUMENTS

| | | |
|---|---|---|
| 0145491 | 6/1985 | European Pat. Off. . |
| 0119593 | 9/1986 | European Pat. Off. . |
| 59-178079 | 10/1984 | Japan . |
| 2-22966 | 1/1990 | Japan . |

OTHER PUBLICATIONS

English translation of Abstr. of Japanese Appln. No. 63-210480.
English translation of Abstr. of Japanese Appln. No. 63-305675.
English translation of Abstract of Japan Application No. 2-22966.

Primary Examiner—Mark R. Powell
Assistant Examiner—John W. Miller
Attorney, Agent, or Firm—Birch, Stewart, Kolasch & Birch

[57] ABSTRACT

The clamp circuit of the present invention includes a comparator 10, a pulse signal generating circuit 10, an integrating circuit 17 and a subtractor 17. The comparator compares a composite video signal with a threshold potential and detects a composite synchronizing signal. The pulse signal generating circuit generates pulse signals indicative of which of the detected composite synchronizing signal and a reference time period is larger. The integrating circuit corrects a threshold potential in response to the pulse signals and such that the pulse width of the horizontal synchronizing signal of the composite video signal corresponds to the reference time period t. The subtractor subtracts the threshold potential from the composite video signal, so as to fix the DC level of the composite video signal at a prescribed potential. Since a threshold potential which makes constant the pulse width of the synchronizing pulse signals is generated and the video signal is clamped by using this threshold potential, the video signal including the synchronizing signal is made less susceptible to the influence of noise and the like, and clamping operation of the video signal can be done more accurately.

18 Claims, 20 Drawing Sheets

CLAMP CIRCUIT FOR CLAMPING VIDEO SIGNAL INCLUDING SYNCHRONIZING SIGNAL AT A PRESCRIBED POTENTIAL

BACKGROUND OF THE INVENTION

1. Field of the Invention

The present invention relates to an improvement of a circuit for clamping a DC level of a video signal including a synchronizing signal at a prescribed potential.

2. Description of the Background Art

FIG. 18 is a schematic block diagram showing an example of a conventional television receiver. FIG. 19 is a waveform diagram of a composite video signal.

For simplicity of drawing, an antenna, high frequency circuitry and so on of the television receiver are not shown in FIG. 18. Referring to FIG. 18, the television receiver includes an input terminal 1 to which a composite video signal is input, a feedback type clamp circuit 100, a video amplifying circuit 101, a video output circuit 102, a CRT 103, a color signal circuit 104, a synchronizing deflection circuit 105, and a clamp pulse generating circuit 106. The composite video signal input to the input terminal 1 has its DC level clamped at a prescribed level by the clamp circuit 100, and thereafter it is applied to the video amplifying circuit 101. The video amplifying circuit 101 amplifies a color signal after separation of color subcarrier and the synchronizing signal. The color signal circuit 104 forms a color difference signal from the color subcarrier. The video output circuit 102 adds the color difference signal to a luminance signal to form a signal to be applied to three electrodes, that is, the R, G and B electrodes of a CRT 103. The sync deflection circuit 105 separates the synchronizing signal, synchronizes vertical and horizontal oscillations and generates a signal to form an image. The clamp pulse generating circuit 106 generates a clamp pulse during a certain DC level period of the composite video signal, in response to the synchronizing signal which has been subjected to amplitude separation by the sync deflection circuit 105. Generally, the clamp pulse is inserted to the back porch of the composite video signal shown in FIG. 19.

FIG. 20 is a block diagram showing an example of such a clamp circuit. The clamp circuit shown in FIG. 20 includes an input terminal 1 to which a composite video signal is input, a level shift circuit 2 for clamping the DC level of the composite video signal at a prescribed potential, an output terminal 3 from which the composite video signal clamped by the level shift circuit 2 is output, a clamp pulse input terminal 5 to which the clamp pulse is input, a constant voltage source 6 generating a constant DC voltage, a comparator 4 for comparing the output from the level shift circuit 2 and the voltage from the constant voltage source 6 in response to a clamp pulse, and a capacitor 7 charging/discharging of which is controlled by the comparator 4.

In operation, the composite video signal is applied through the input terminal 1 to the level shift circuit 2. The level shift circuit 2 adds a certain potential to the composite video signal to shift the level of the composite video signal, the composite video signal having its level shifted is output from the output terminal 3. The potential applied to the composite video signal is to make constant the DC level of the composite video signal which fluctuates. The method for generating the potential to be added is as follows. The comparator 4 compares the level of the composite video signal from the level shift circuit 2 with the potential of the constant voltage source 6 connected to the comparator 4 in response to a clamp pulse from the clamp pulse input terminal 5, and generates a difference current corresponding to the difference between the DC level of the composite video signal and the potential of the constant voltage source 6. The period in which the clamp pulse is input corresponds to the period of the DC level in the composite video signal, which is generally the period of the back porch. The generated difference current is output to the level shift circuit 2. By this difference current, the capacitor 7 connected between the level shift circuit 2 and the ground terminal is charged or discharged, and voltages at both ends of the capacitor 7 are maintained until the next clamp pulse is input. By the voltages at both ends of the capacitor 7 provided in this manner, the amount of level shift by the level shift circuit 2 is controlled. By these operations, a certain DC level of the composite video signal is corrected to be equal to the potential of the constant voltage source 6.

High definition television systems (HDTV) have come to be commercially available very recently.

FIG. 21 is a waveform diagram of a video signal including a three value synchronizing signal (which is a proposed standard synchronizing signal for realizing high vision broadcasting) such as a HDTV video signal. In FIG. 21, the solid line represents the original waveform on the transmitting side, while the dotted line represents the waveform at the receiving end (corresponding to the input terminal 1 of FIG. 20) such as a VTR reproduction, which waveform is a little moderate because of transmission loss through the transmission path.

In the above described circuitry, a clamp pulse forming circuit must be separately provided in addition to the clamp circuit, resulting in a large scale circuitry. In the composite video signal reproduced by a VTR or the like, cross talk from adjacent tracks, leaked FM carrier and other noise are output superposed on the video signal Further, in the weak electric field such as in the case of receiving television broadcasting, there is caused degradation of S/N ratio.

If there is, for example, a noise at a certain DC level portion of the input composite video signal, accurate level comparison cannot be done, and as a result, accurate clamping operation becomes impossible. It is possible to remove the color burst signal successive to the synchronizing signal by means of a low pass filter and setting the position of the clamp pulse at that portion However, by this method, the color burst cannot be completely removed, and therefore level comparison is not very accurate.

Such problem similarly occurs in the video signals for HDTV. Further, the DC level period of the video signal is quite short in the HDTV video signal, and precision in level detection is not sufficient. Alternatively, the three value synchronizing signal portion may be integrated by an integrating circuit for providing an average and the position of the clamp pulse may be set at that portion. However, the waveform of the three value synchronizing signal cannot be completely removed, and the level comparison is not very accurate. Clamping using negative peak value (bottom level of the synchronizing pulse of negative polarity) in the video signal is known as another method. However, accurate clamping is not achieved because of the influence of noise or degradation of amplitude characteristic dependent on conditions of the transmission path.

SUMMARY OF THE INVENTION

An object of the present invention is to enable accurate clamping operation, even if there is a noise in a certain DC level portion of a composite video signal using a clamp circuit for clamping DC level of a composite video signal at a prescribed potential.

Another object of the present invention is to enable accurate clamping operation of a video signal, even if the video signal includes a three value synchronizing signal, using a clamping circuit for clamping DC level of a video signal at a prescribed potential.

Briefly stated, the clamp circuit of the present invention is for clamping a DC level of a composite video signal at a prescribed potential, including a synchronizing signal detector, a pulse signal generator, a threshold potential generator and a level fixing circuit.

The synchronizing signal detector includes at least two input nodes and one output node, and compares a composite video signal applied to one input node with a threshold potential at the other input node to detect a synchronizing signal included in the composite video signal.

The pulse signal generator generates a first pulse signal when the pulse width of the synchronizing signal detected by the synchronizing signal detector is larger than a set prescribed reference time period, and a second pulse signal when the pulse width of the synchronizing signal is smaller than the reference time period.

The threshold potential generator generates a threshold potential in response to the generated first or second pulse signal, and feeds back the generated threshold potential to the other input node of the synchronizing signal detector.

The level fixing circuit receives the composite video signal and the threshold potential, and fixes the DC level of the video signal at a prescribed potential.

In operation, if the pulse width of the synchronizing signal detected from the video signal is larger than the reference time period, the first pulse signal indicative thereof is generated. Conversely, if the pulse width of the synchronizing signal is smaller than the reference time period, the second pulse signal indicative thereof that is generated. The threshold potential generator generates a threshold potential in response to the generated first or second pulse signal. The generated threshold potential is fed back to the other input node of the synchronizing signal detector. The synchronizing signal generator compares the fed back threshold potential and a certain DC level in the input composite video signal and detects a synchronizing signal. Since the synchronizing signal is detected in this manner, the pulse width of the synchronizing signal is corrected to correspond to the reference time period. The threshold potential is also applied to the level fixing circuit, and the level fixing circuit fixes the DC level of the composite video signal at a prescribed potential by virtue of the threshold potential.

The clamp circuit of the present invention is less susceptible to the influence of noise and the like when the DC level of the reproduced composite video signal, such as in a VTR, is to be clamped at a prescribed potential, and compared with the conventional clamp circuit. Accordingly, accuracy in the clamping operation can be improved.

A clamp circuit in accordance with another aspect of the present invention is a circuit for clamping a DC level of a video signal including a three value synchronizing signal including a positive synchronizing pulse signal and a negative synchronizing pulse signal at a prescribed potential, and it includes a first synchronizing signal detector, a negative pulse signal generator, a first threshold potential generator, a second synchronizing signal detector, a positive pulse signal generator, a second threshold potential generator, and a level fixing circuit.

The first synchronizing signal detector includes at least two input nodes and one output node, compares a video signal applied to one input node with a threshold potential at the other input node, and detects a synchronizing pulse signal of negative polarity included in the video signal.

The negative pulse signal generator generates a first pulse signal when the pulse width of the synchronizing signal of negative polarity detected by the first synchronizing signal detector is larger than a set prescribed reference time period, and a second pulse signal when the pulse width of the synchronizing signal of negative polarity is smaller than the reference time period.

The first threshold potential generator generates a first threshold potential in response to the first or second pulse signal generated by the negative pulse signal generator, and feeds back the generated first threshold potential to the other input node of the first synchronizing signal detector.

The second synchronizing signal detector includes at least two input nodes and one output node, compares a video signal applied to one input node with the threshold potential at the other input node, and detects a synchronizing pulse signal of positive polarity included in the video signal.

The positive pulse signal generator generates a first pulse signal when the pulse width of the synchronizing signal of positive polarity detected by the second synchronizing signal detector is larger than a set prescribed reference time period, and a second pulse signal when the pulse width of the positive synchronizing signal is smaller than the reference time period.

The second threshold potential generator generates a second threshold potential in response to the first or second pulse signal generated by the positive pulse signal generator, and feeds back the generated second threshold potential to the other input node of the second synchronizing signal detector.

The level fixing circuit receives the video signal and the first and second threshold potentials, and fixes the DC level of the video signal including the three value synchronizing signal at a prescribed potential.

In operation, in the clamp circuit in accordance with another aspect of the present invention, a first synchronizing signal detector, a negative pulse signal generator and a first threshold potential generator are provided for a synchronizing pulse signal of negative polarity, and a second synchronizing signal detector, a positive pulse signal generator and a second threshold potential generator are provided for the synchronizing pulse signal of positive polarity. By the first synchronizing signal detector, the negative pulse signal generator and the first threshold potential generator, the synchronizing signal of the negative polarity is corrected so that its pulse width corresponds to the reference time period. By the second synchronizing signal detector, the positive pulse signal generator and the second threshold potential generator, the synchronizing signal of positive polarity is corrected so that the pulse width corresponds to the reference time period. In this manner, the pulse width of the synchronizing pulse signal of negative polarity and the pulse width of the synchronizing pulse signal of positive polarity are made constant, and by applying the first and second threshold potentials used for this correction to the level fixing circuit, the DC level of the video signal including the three value synchronizing signal can be made constant.

In accordance with this other aspect of the present invention, even a video signal including the three value synchronizing signal can be made less susceptible to the influence of noise and the like, and accuracy in clamping operation can be improved as compared with the conventional clamp circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein:

BRIEF DESCRIPTION OF THE DRAWINGS

Figure 1:
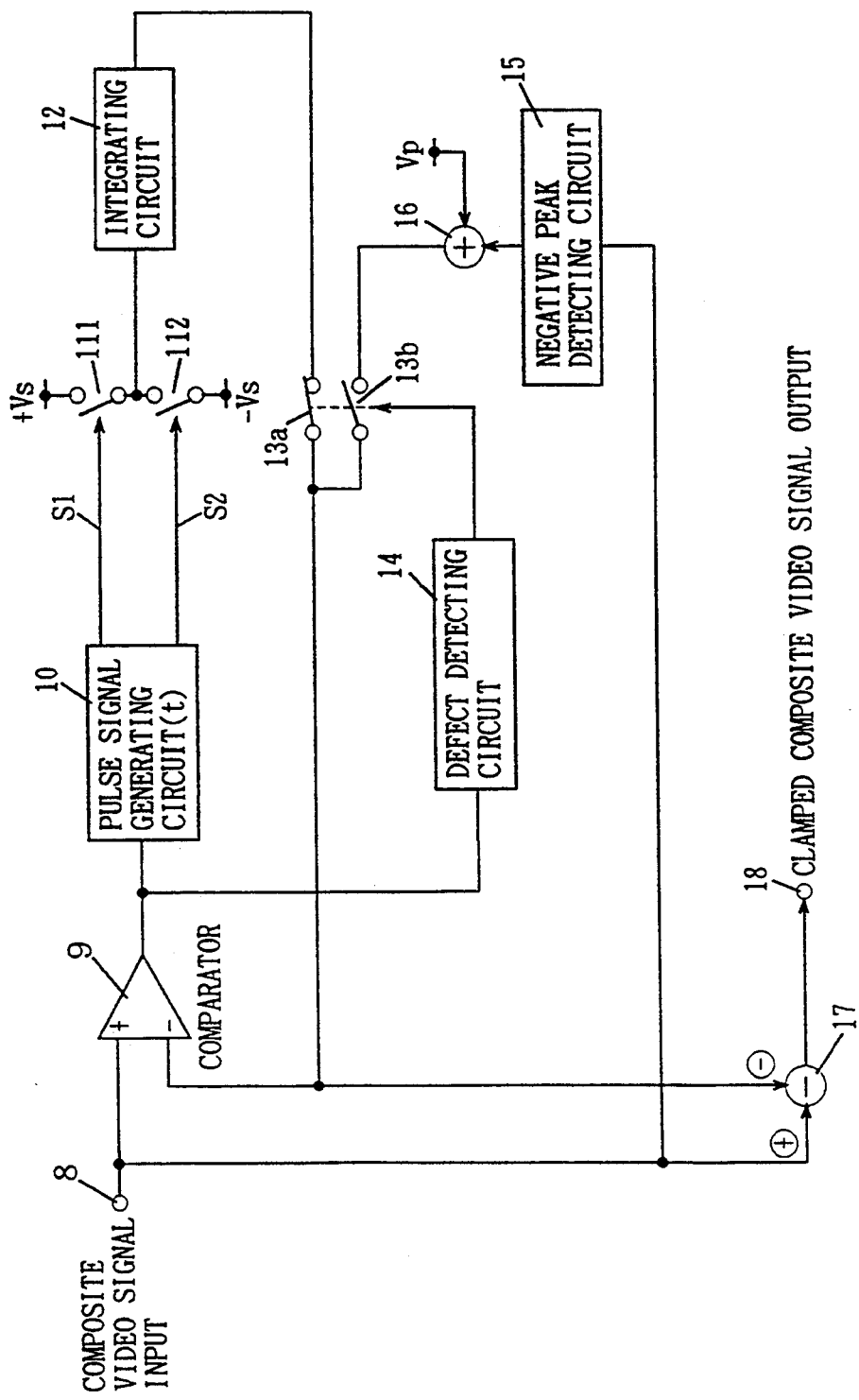

FIG. 1 is a block diagram showing one embodiment of the clamp circuit in accordance with the present invention.

Figure 2:
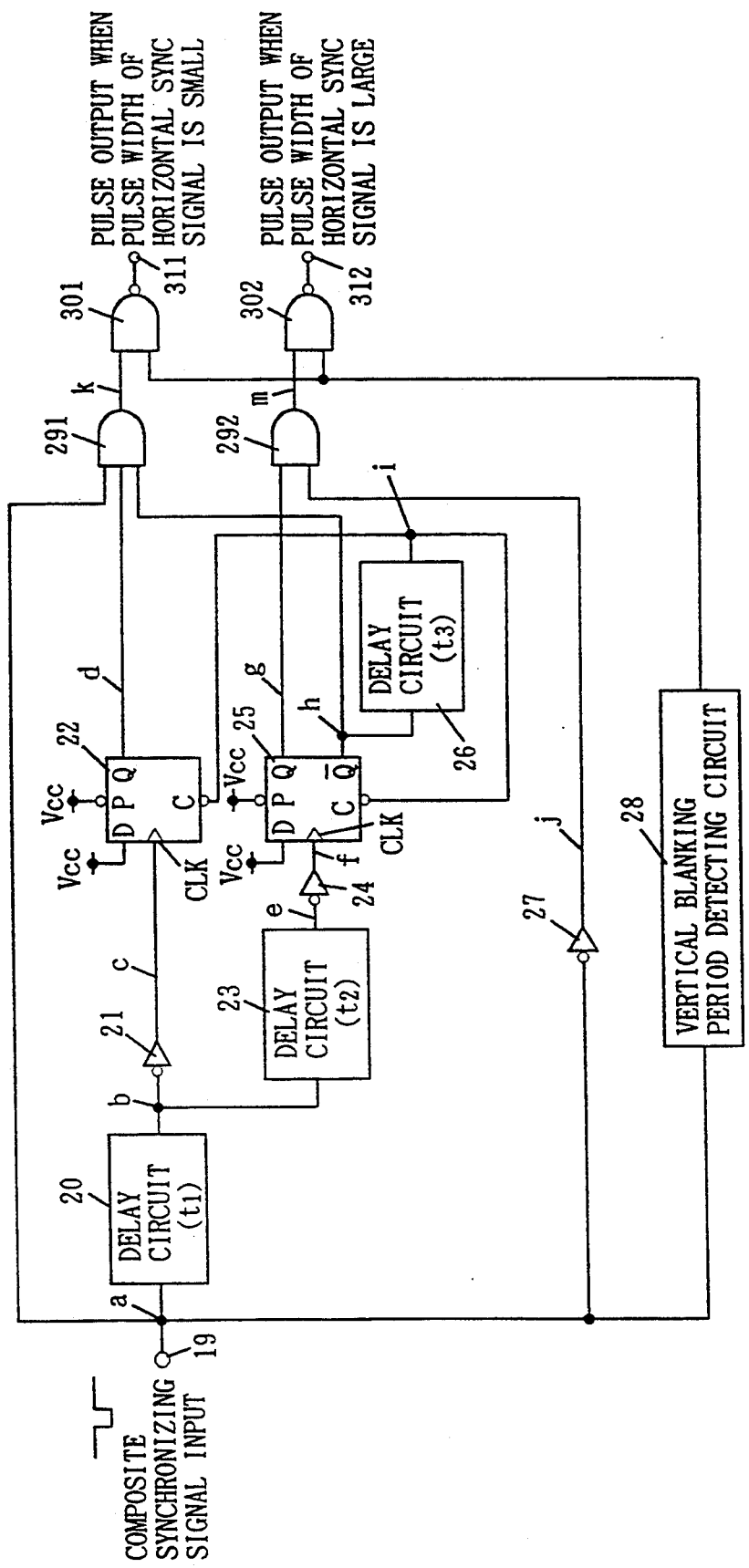

FIG. 2 is a block diagram of the pulse signal generating circuit shown in FIG. 1.

Figure 3:
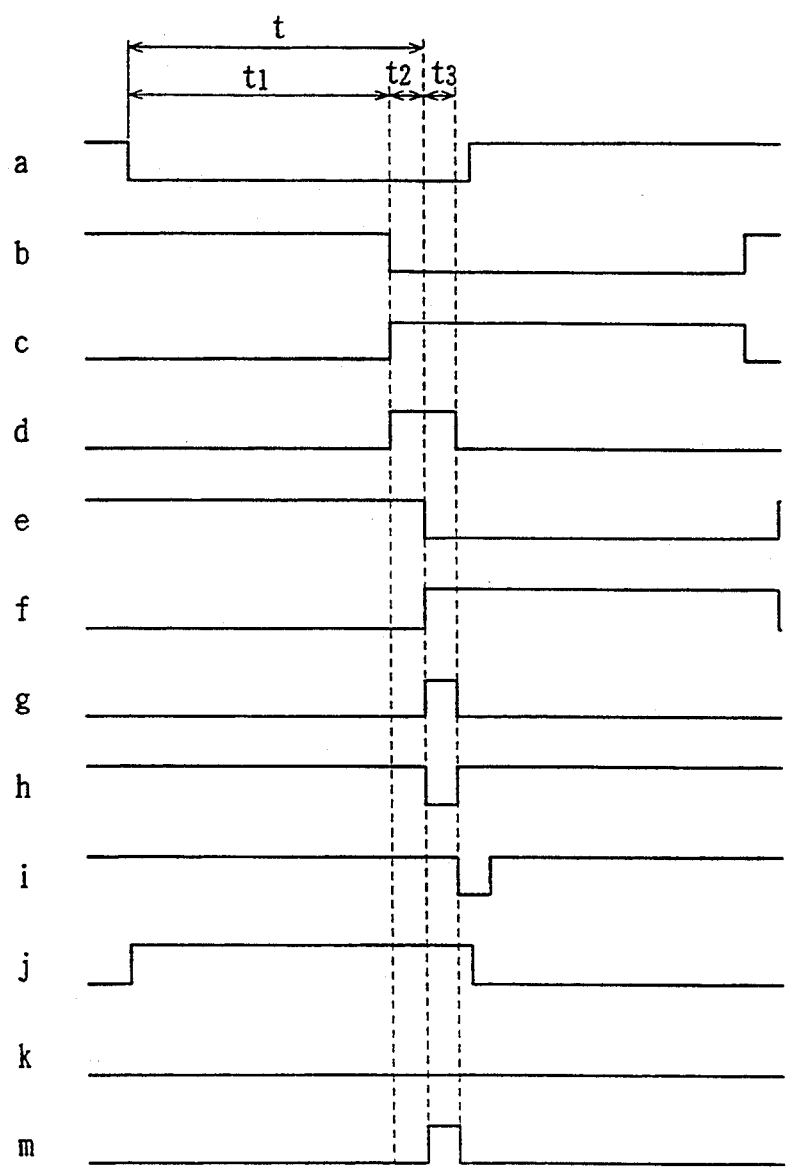

FIG. 3 is a diagram of signal waveforms of various portions of the pulse signal generating circuit shown in FIG. 2, showing an example in which the pulse width of the synchronizing signal is larger than t+t3.

Figure 4:
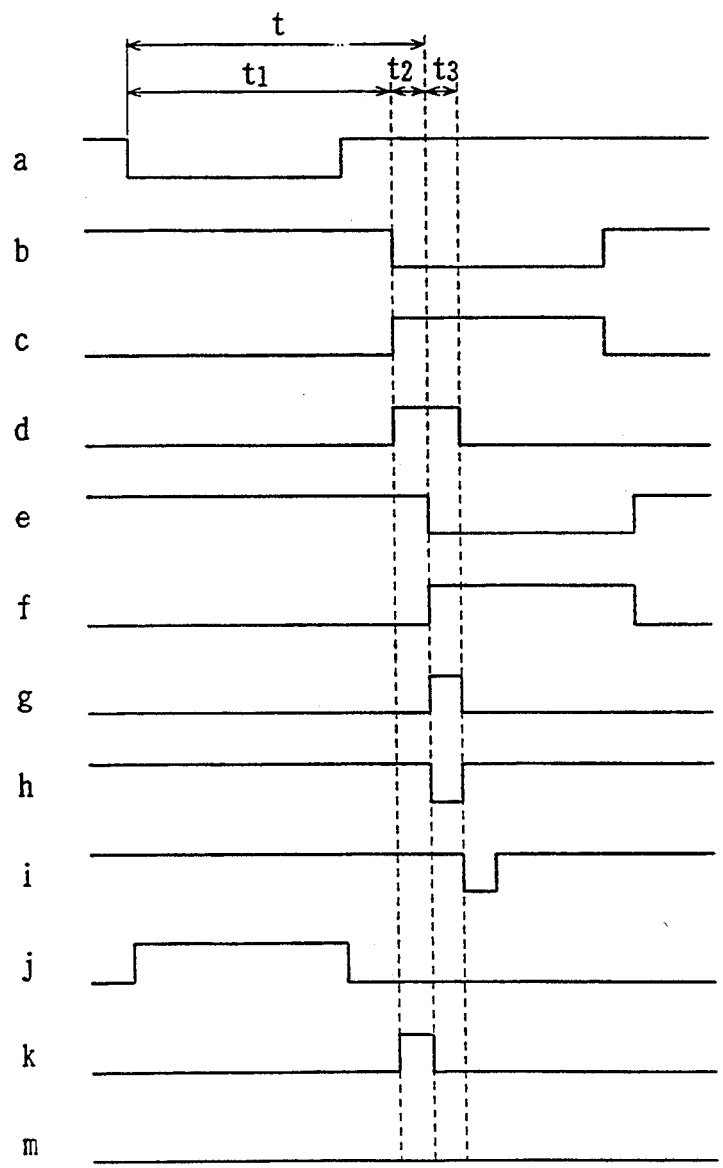

FIG. 4 is a diagram of signal waveforms of various portions of the pulse signal generating circuit shown in FIG. 2, showing an example in which the pulse width of the synchronizing signal is smaller than t−t2.

Figure 5:
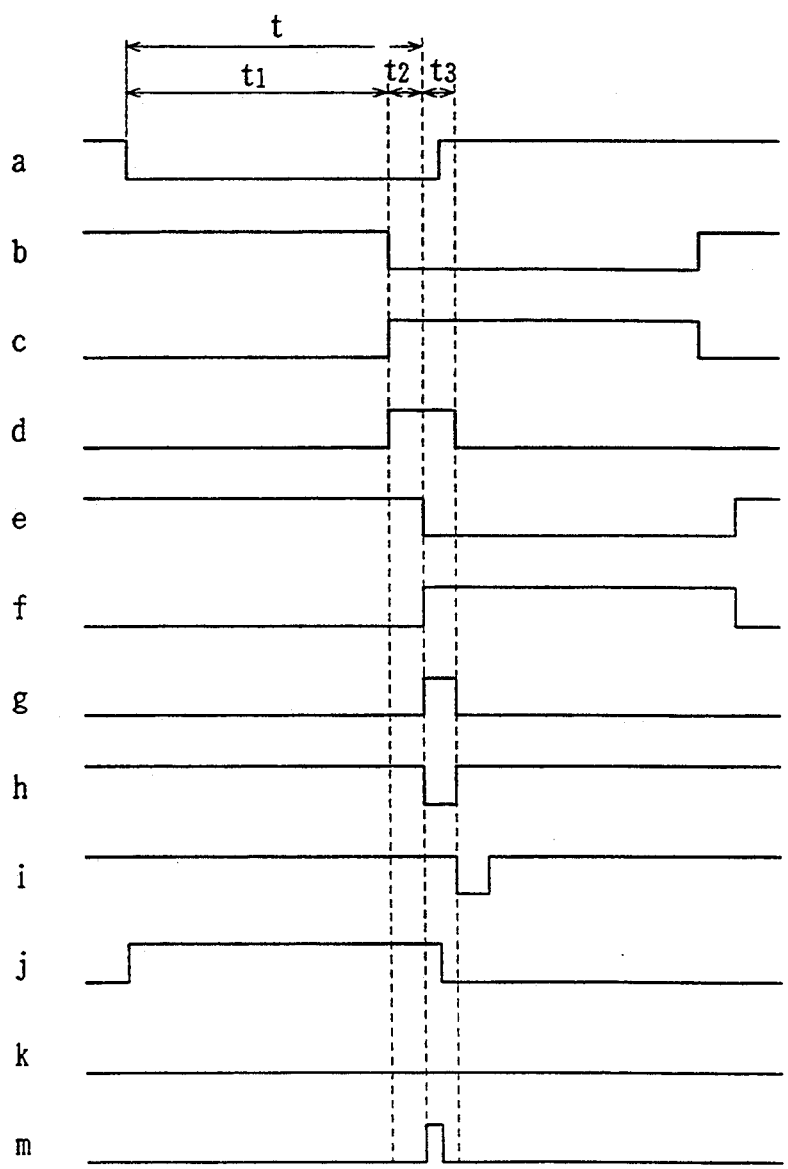

FIG. 5 is a diagram of signal waveforms of various portions of the pulse signal generating circuit shown in FIG. 2, showing an example in which the pulse width of the synchronizing signal is larger than t and smaller than t+t3.

Figure 6:
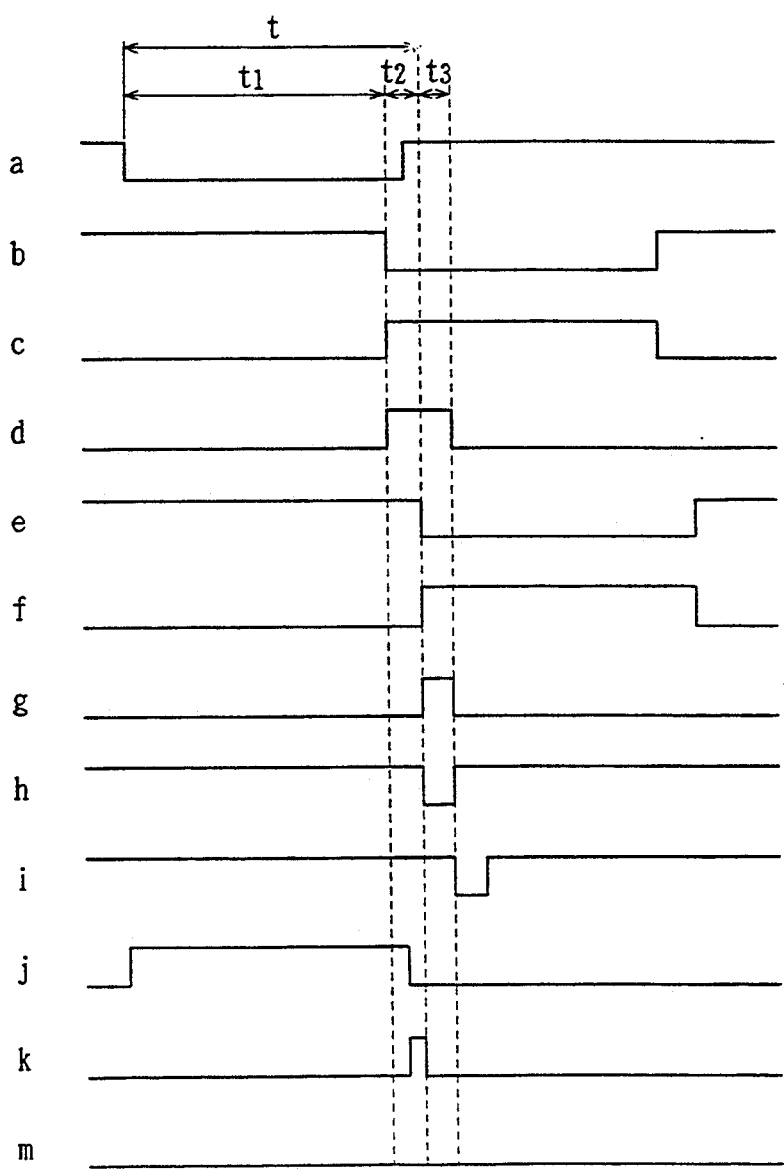

FIG. 6 is a diagram of signal waveforms of various portions of the pulse signal generating circuit shown in FIG. 2, showing an example in which the pulse width of the synchronizing signal is smaller than t and larger than t−t2.

Figure 7:
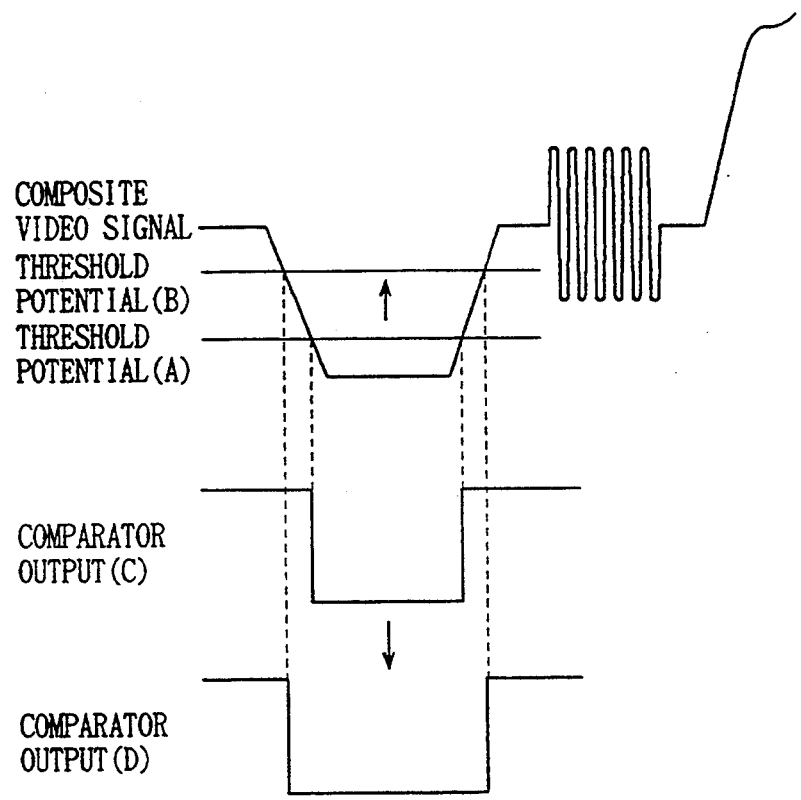

FIG. 7 is a diagram of signal waveforms showing the relation between the composite video signal and the threshold potential.

Figure 8:
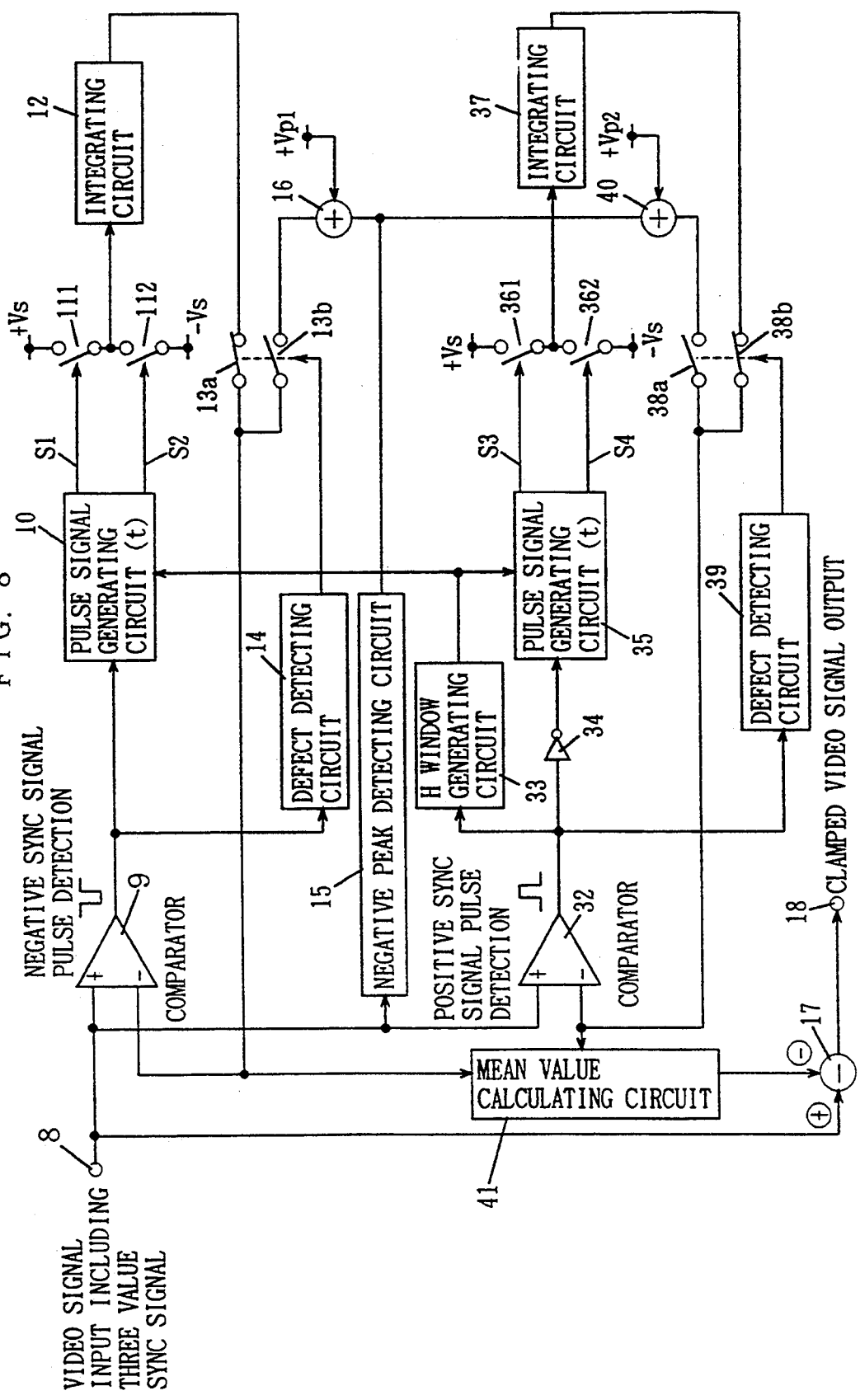

FIG. 8 is a block diagram showing another embodiment of the present invention.

Figure 9:
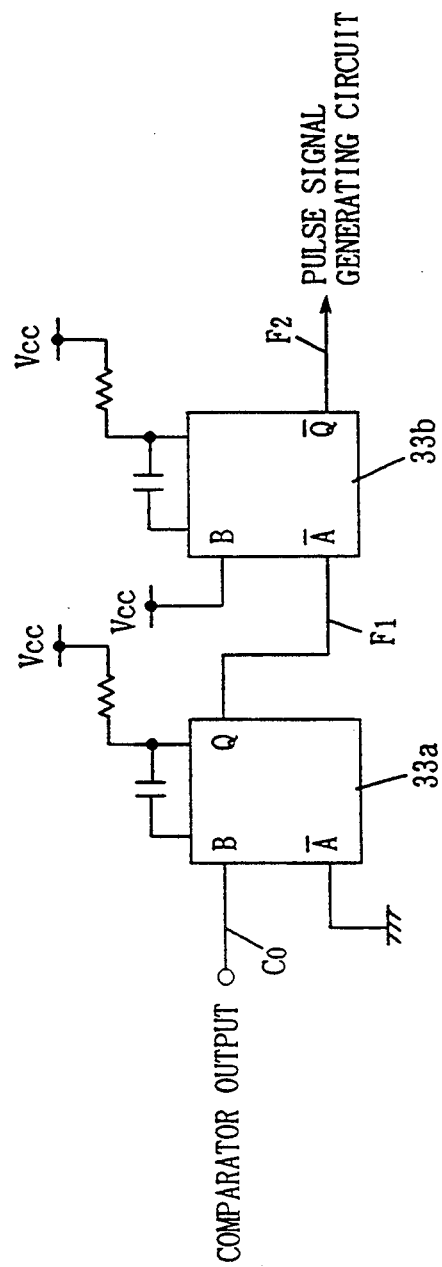

FIG. 9 is a schematic diagram showing one example of a H window generating circuit shown in FIG. 8.

Figure 10:
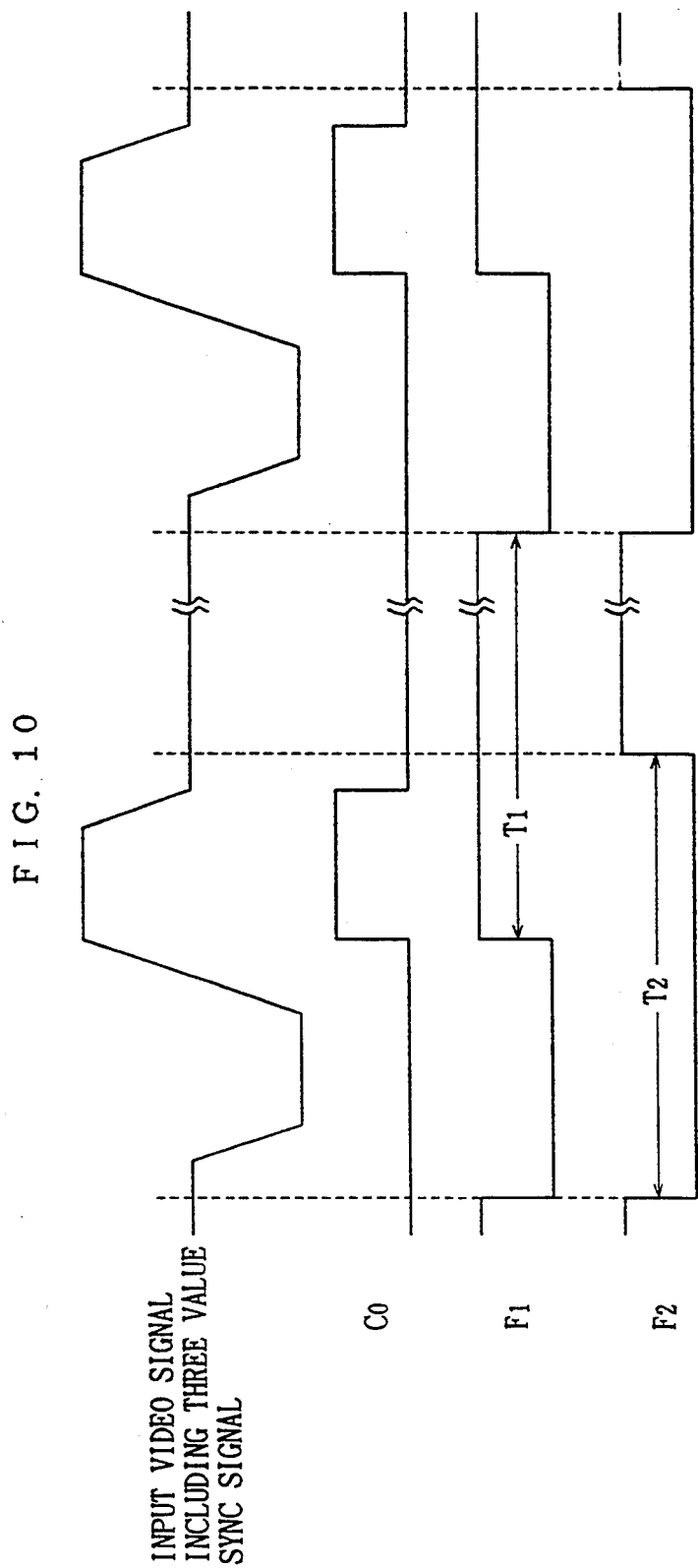

FIG. 10 is a diagram of signal waveforms showing the relation between the video signal including the three value synchronizing signal and the waveforms of various portions of the H window generating circuit shown in FIG. 9.

Figure 11:
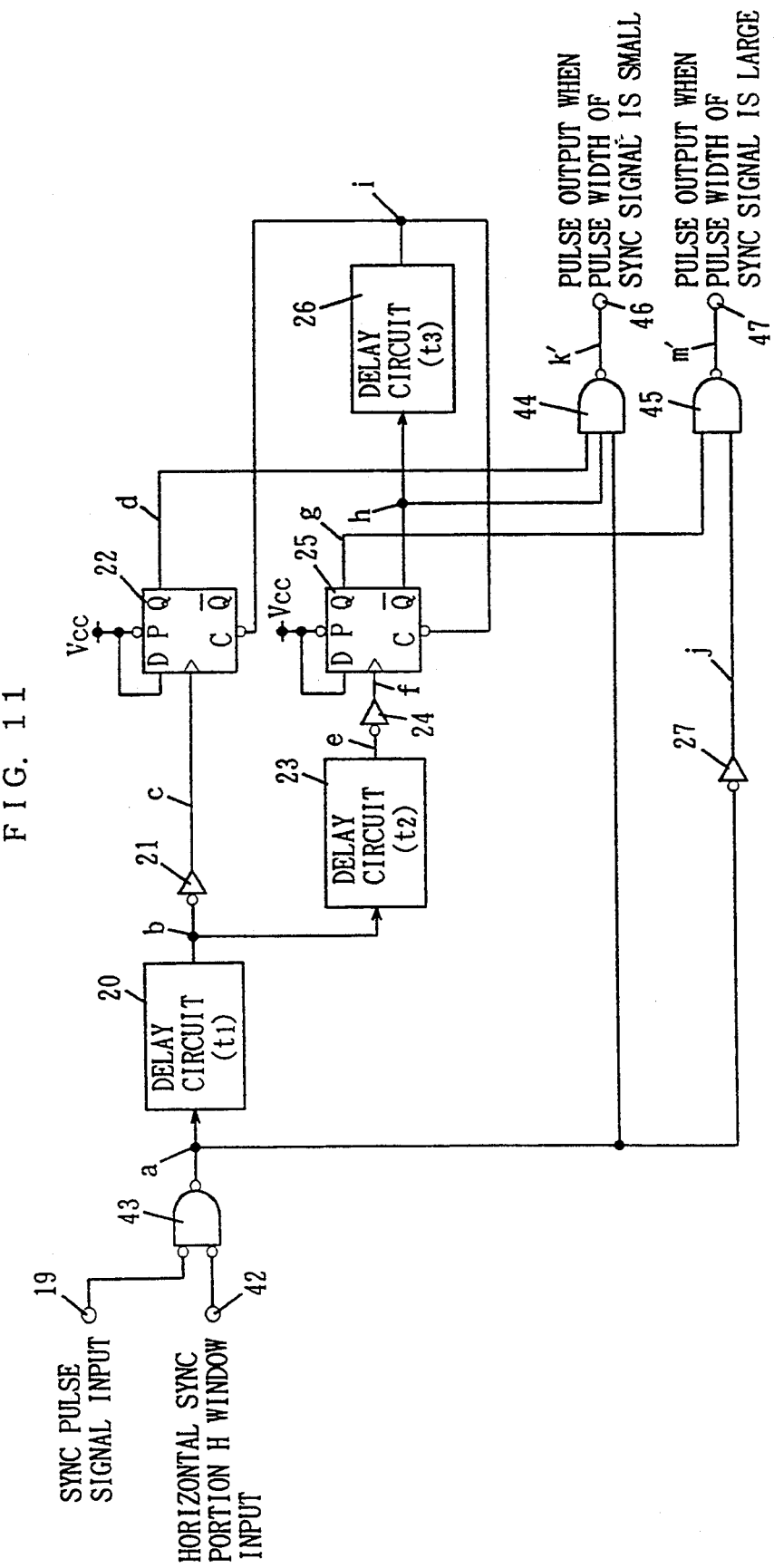

FIG. 11 is a block diagram of the pulse signal generating circuit shown in FIG. 8.

Figure 12:
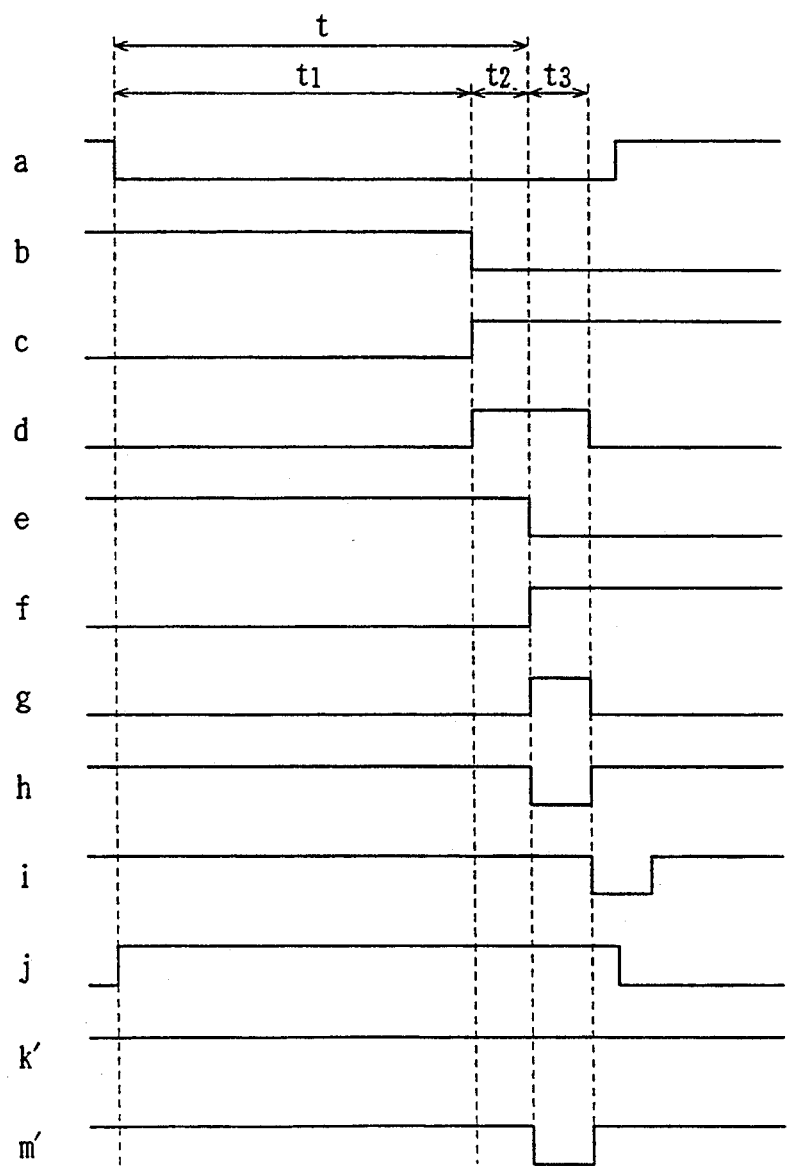

FIG. 12 is a diagram of signal waveforms of various portions of the pulse signal generating circuit shown in FIG. 11, showing an example in which the pulse width of the synchronizing signal is larger than t+t3.

Figure 13:
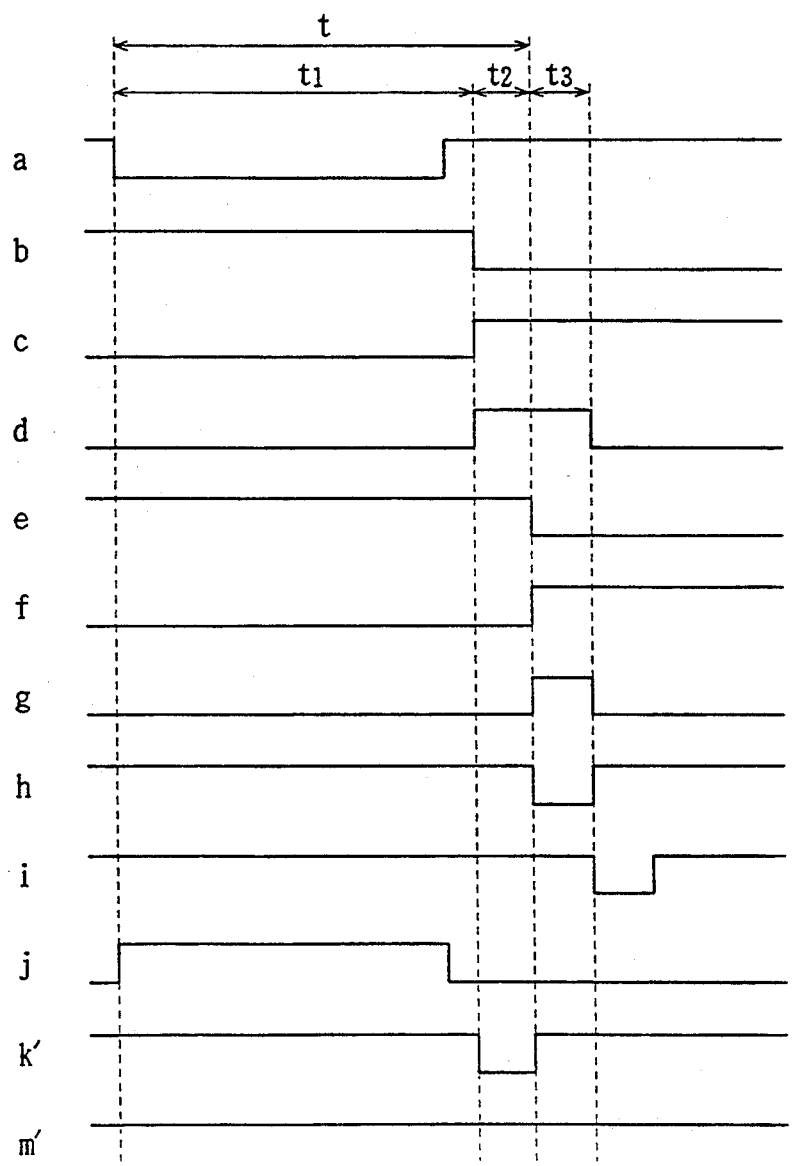

FIG. 13 is a diagram of signal waveforms of various portions of the pulse signal generating circuit shown in FIG. 11, showing an example in which the pulse width of the synchronizing signal is smaller than t−t2.

Figure 14:
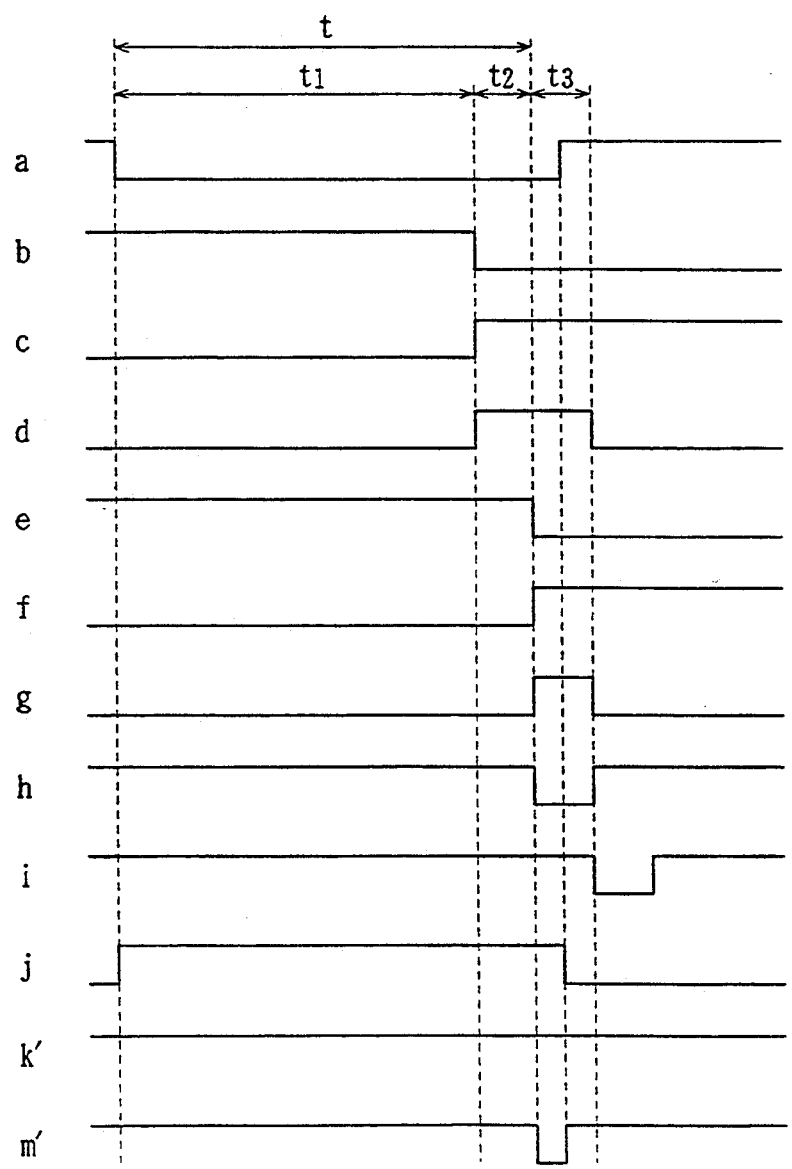

FIG. 14 is a diagram of signal waveforms of various portions of the pulse signal generating circuit shown in FIG. 11, showing an example in which the pulse width of the synchronizing signal is larger than t and smaller than t+t3.

Figure 15:
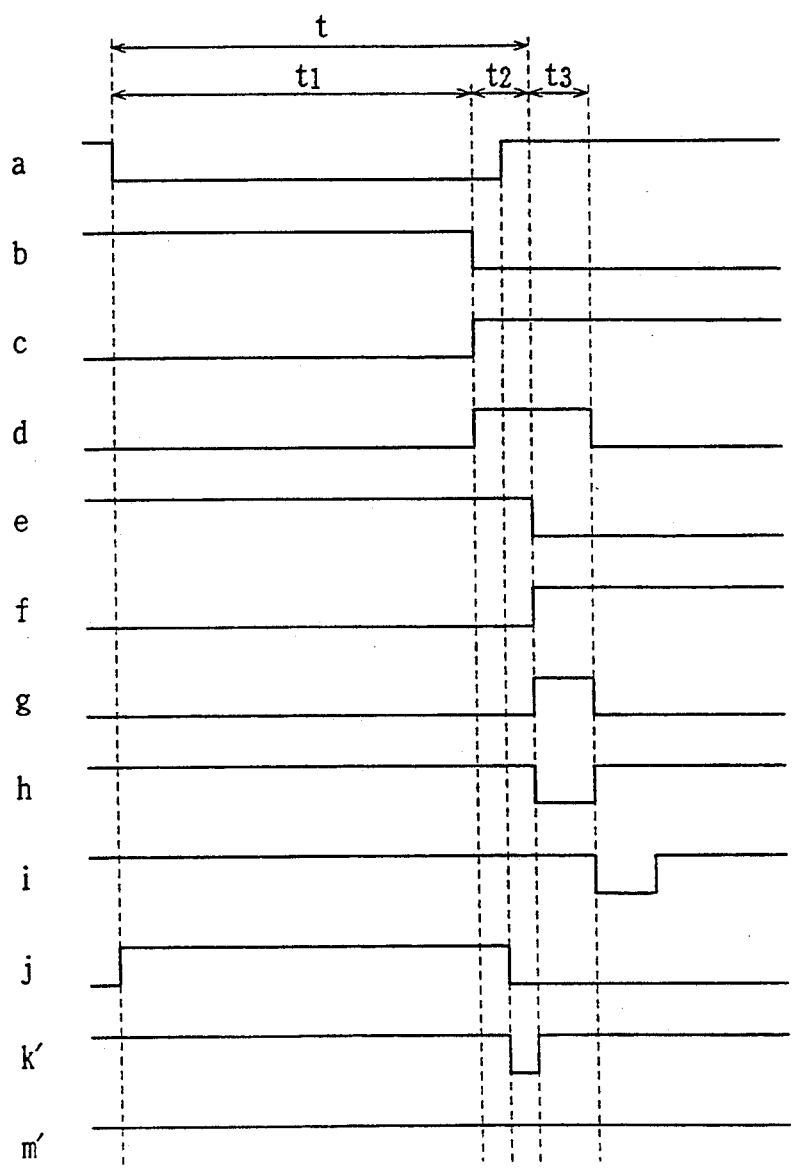

FIG. 15 is a diagram of signal waveforms of various portions of the pulse signal generating circuit shown in FIG. 11, showing an example in which the pulse width of the synchronizing signal is smaller than t and larger than t−t2.

Figure 16:
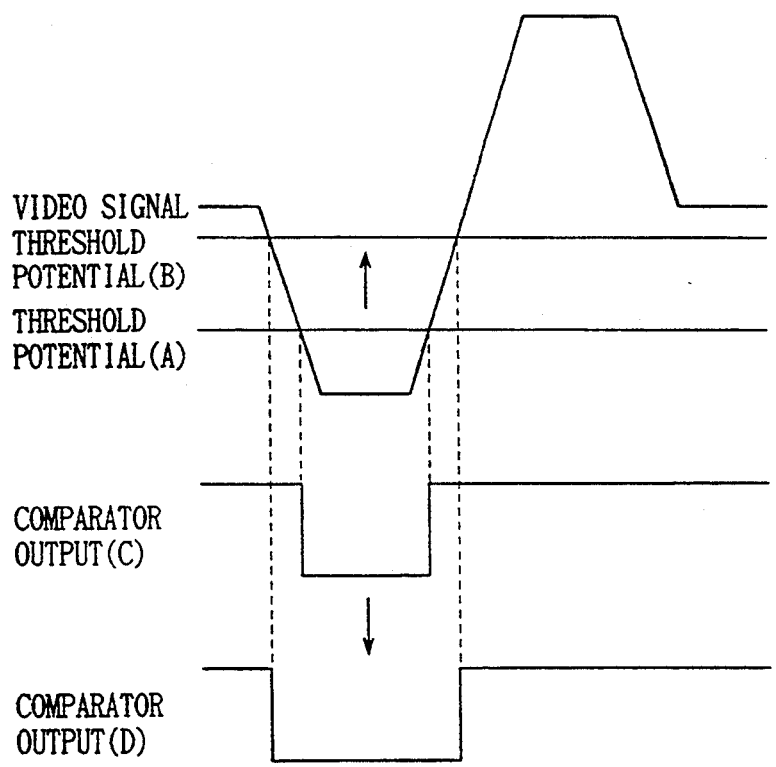

FIG. 16 is a diagram of signal waveforms showing the relation between the negative synchronizing pulse signal and the threshold potential.

Figure 17:
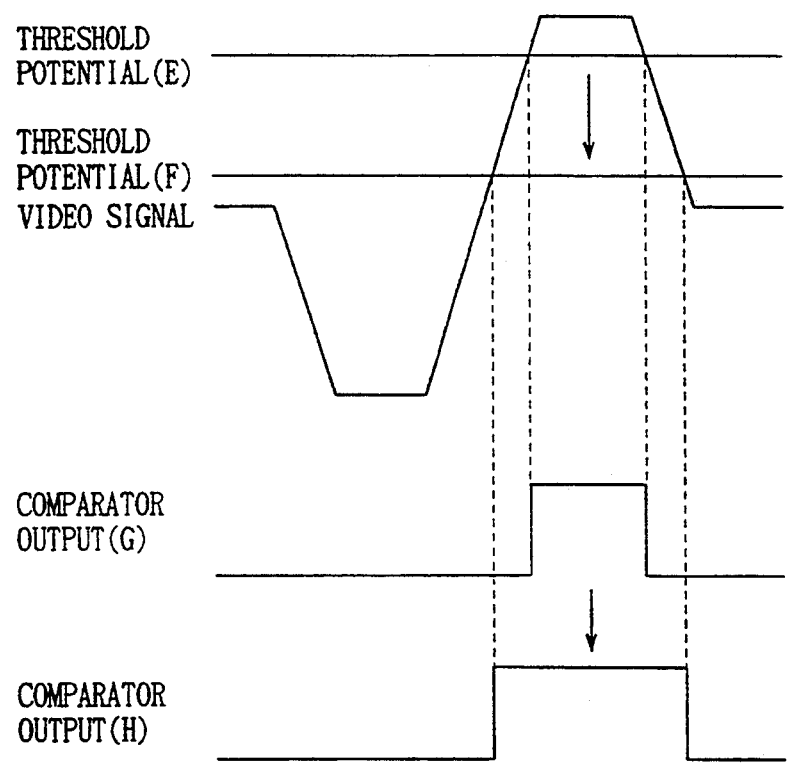

FIG. 17 is a diagram of signal waveforms showing the relation between the positive synchronizing pulse signal and the threshold potential.

Figure 18:
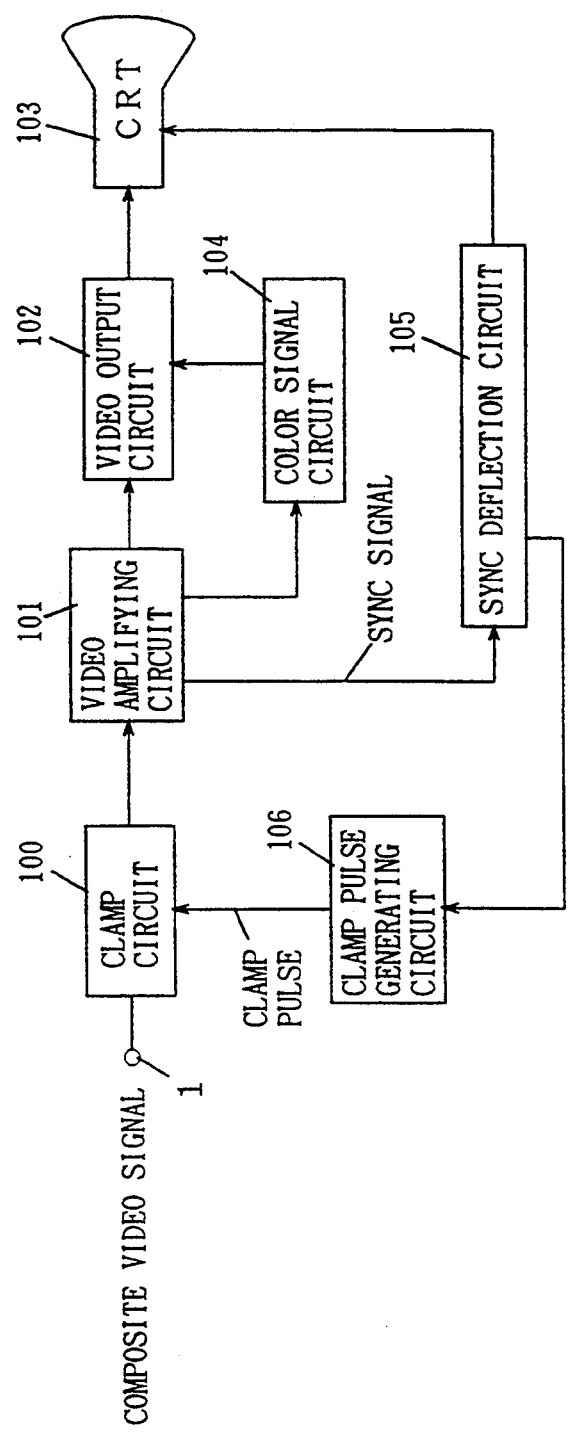

FIG. 18 is a schematic block diagram showing an example of a conventional television receiver.

Figure 19:
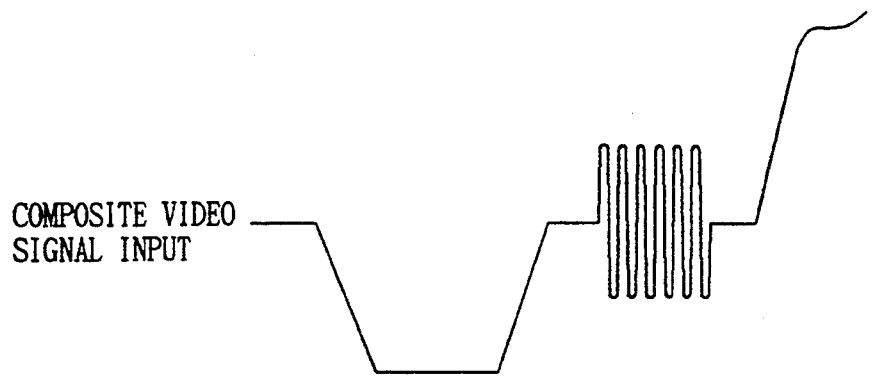

FIG. 19 is a diagram of the waveform of the composite video signal output from a VTR or the like.

Figure 20:
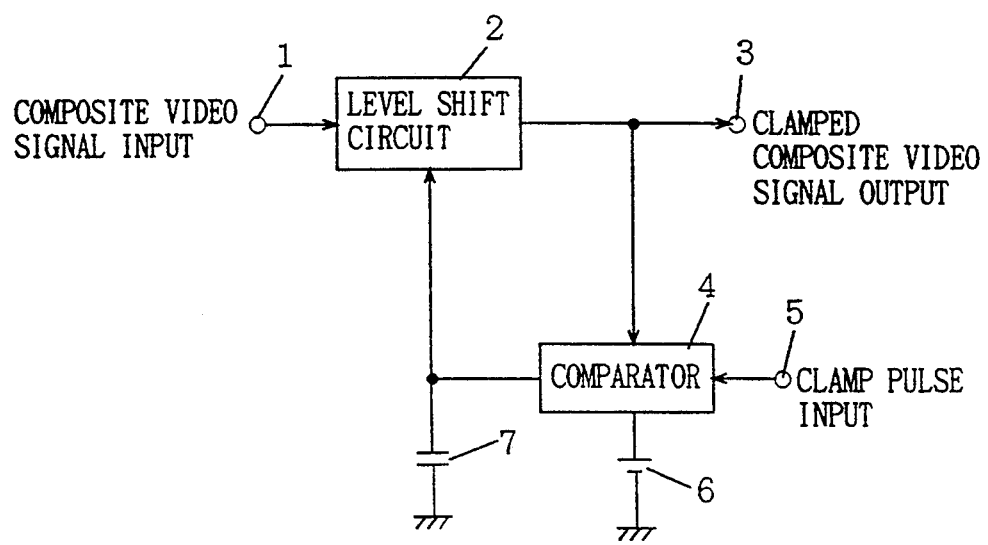

FIG. 20 is a block diagram of a conventional feed back type clamp circuit.

Figure 21:
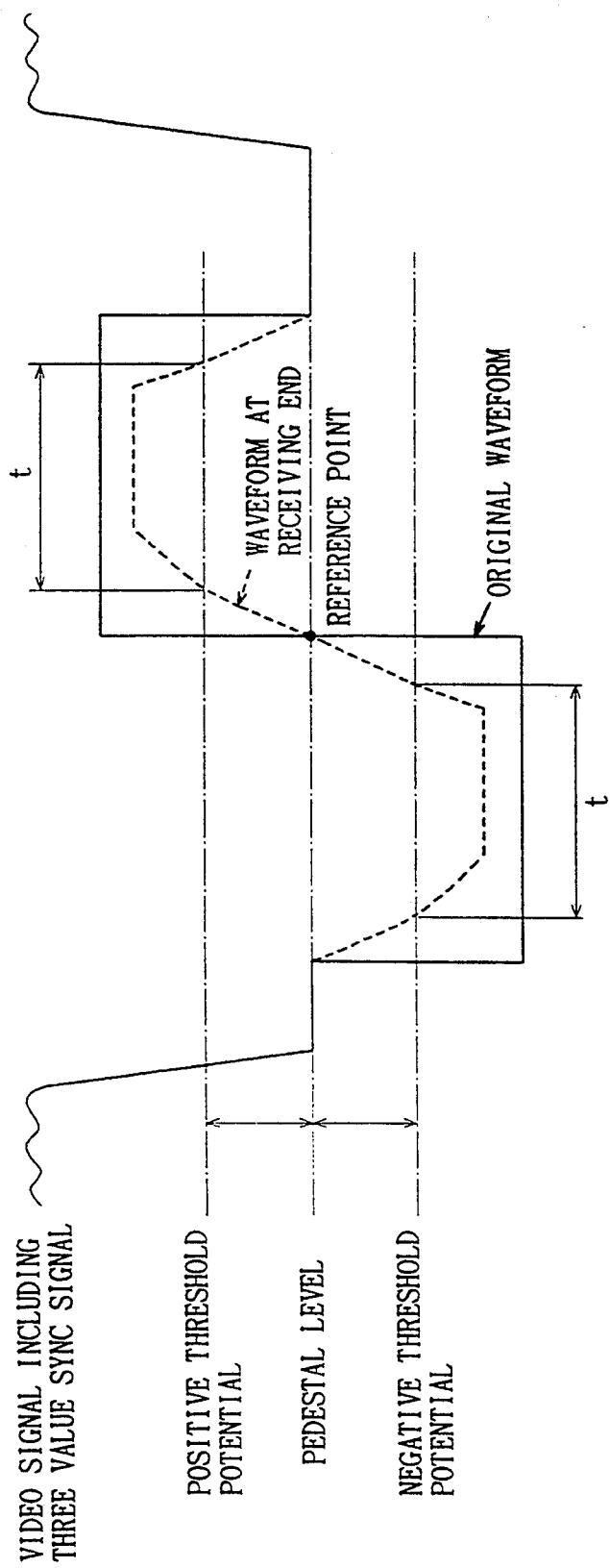

FIG. 21 is a diagram of the waveform of the video signal including the three value synchronizing signal.

DESCRIPTION OF THE PREFERRED EMBODIMENTS

FIG. 1 is a block diagram showing one embodiment of the present invention. Referring to FIG. 1, the clamp circuit includes an input terminal 8 to which a composite video signal is input, a comparator 9 for detecting a composite synchronizing signal, a pulse signal generating circuit 10 generating pulse signals S1 and S2 corresponding to a difference between the pulse width of the horizontal synchronizing signal included in the composite synchronizing signal and a predetermined reference time period t, switching circuits 111 and 112, an integrating circuit 12 for integrating output from switching circuit 111 and 112, a switching circuit 13a connected between the output of the integrating circuit 12 and a negative input terminal of the comparator 9, a defect detecting circuit 14 for detecting a defect of the composite synchronizing signal, a negative peak detecting circuit 15 for detecting a negative peak value (bottom level) of the composite video signal, an adder 16 for adding a certain positive constant potential Vp to the output of the negative peak detecting circuit 15, a switching circuit 13b connected between the output of the adder 16 and negative input terminal of the comparator 9, a subtractor 17, and an output terminal 18 connected to the output of the subtractor 17.

The comparator 9 includes a positive input terminal, a negative input terminal and an output terminal. The positive input terminal is connected to the input terminal 8, the negative input terminal is connected to the outputs of the switching circuits 13a and 13b, and the output terminal is connected to the pulse signal generating circuit 10 and to the defect detecting circuit 14.

The pulse signal generating circuit 10 outputs a pulse signal S1 corresponding to a difference of pulse width when the pulse width of the horizontal synchronizing signal in the composite synchronizing signal from the comparator 9 is smaller than a prescribed reference time period t, and outputs a signal S2 corresponding to the difference of pulse width when the pulse width of the horizontal synchronizing signal in the composite synchronizing signal is larger than the reference time period t.

The switching circuit 111 has one end connected between a positive constant potential +Vs and an input of the integrating circuit 12, and turns on/off in response to the pulse signal S1.

The switching circuit 112 has one end connected to the input of the integrating circuit 12 together with the switching circuit 111, and the other end connected to a negative constant potential −Vs. The switching circuit 112 turns on/off in response to the pulse signal S2.

The integrating circuit 12 generates a threshold potential by integrating the outputs of the switching circuits 111 and 112.

The switching circuit 13a is connected between the output of the integrating circuit 12 and the negative input terminal of the comparator 9, and turns on/off in response to an output from the defect detecting circuit 14.

The subtractor circuit 17 includes two input nodes and one output node, one input node connected to receive the threshold potential generated by the integrating circuit 12, the other input node connected to the input terminal 8 and the output node connected to the output terminal 18.

The operation of the clamp circuit shown in FIG. 1 will be described.

First, a video signal including a synchronizing signal (composite video signal) is input to the input terminal 8. Since this signal does not have a DC component, the DC level thereof fluctuates dependent on the average video level. The comparator 9 receives the composite video signal through the positive input terminal, receives the threshold potential at the negative input terminal, and detects only the synchronizing signal portion. Thus it outputs a binary composite synchronizing signal to the pulse signal generating circuit 10. The pulse signal generating circuit 10 determines whether or not the pulse width of the horizontal synchronizing signal in the detected composite synchronizing signal is larger than or smaller than the reference time period, and if the pulse width of the horizontal synchronizing signal is smaller than the reference time period, applies a negative pulse signal S1 to the switching circuit 111. Conversely, if the pulse width of the horizontal synchronizing signal is larger than the reference time period, it applies a negative pulse signal S2 to the switching circuit 112. The switching circuit 111 and 112 turn on when the pulse signal S1 and S2 are negative, and output positive constant potential +VS and negative constant potential-Vs, respectively. Thus the integrating circuit 12 is charged or discharged. By the integrating operation of the integrating circuit 12, a threshold potential is provided, which threshold potential is applied to the comparator 9 and to the subtractor 17. The composite video signal is also input to the subtractor 17, and by this threshold potential, the composite video signal can be clamped.

The switching circuit 13a, 13b, the defect detecting circuit 14, the negative peak detecting circuit 15 and the adder 16 are circuits which operate in case of defect of the composite video signal, and therefore these will be described later.

FIG. 2 is a block diagram showing the details of the pulse signal generating circuit 10 shown in FIG. 1.

Referring to FIG. 2, the pulse signal generating circuit 10 includes a composite synchronizing signal input terminal 19 connected to an output of the comparator 9 (FIG. 1), delay circuits 20, 23 and 26, inverters 21, 24 and 27, D flipflops 22 and 25, a vertical blanking period detecting circuit 28, a 3-input AND gate 291, a 2-input AND gate 292, and NAND gates 301 and 302.

The delay circuit 20 is connected to the composite synchronizing signal input terminal 19 and provides a time delay of t1 to the composite synchronizing signal.

The delay circuit 23 further provides a small delay t2 to the composite synchronizing signal which has been already delayed by the delay circuit 20.

The delay circuit 26 provides a small time delay of t3 to the inverted output $\overline{Q}$ of the D flipflop 25.

The relation between the reference time period t and the delay times t1 and t2 is $t = t1 + t2$. The small delay time t2 is set to the maximum pulse width of the pulse signal S1 when the pulse width of the horizontal synchronizing signal in the composite synchronizing signal is smaller than the reference time period. The small delay time t3 is set to the maximum pulse width of the pulse signal S2 when the pulse width of the horizontal synchronizing signal of the composite synchronizing signal is larger than the reference time period.

The inverter 21 inverts the output of the delay circuit 20. The D flipflop 22 has its clock terminal connected to the output of the inverter 21, its clear terminal C connected to the output of the delay circuit 26, its output terminal Q connected to the input terminal of the 3-input AND gate 291, and its data input terminal D and the preset terminal P connected to the supply voltage Vcc.

The inverter 24 inverts the output of the delay circuit 23.

The D flipflop 25 has its clock terminal CLK connected to the output of the inverter 24 and its clear terminal C connected to the output of the delay circuit 26. The D flipflop 25 has its inverted output terminal $\overline{Q}$ connected to the input of the delay circuit 26 and to the input terminal of the 3-input AND gate 291, its output terminal Q connected to the input terminal of the AND gate 292, and its data input terminal D and preset terminal P connected to the supply voltage Vcc.

The vertical blanking period detecting circuit 28 has its input connected to receive the composite synchronizing signal, and its output connected to the input terminals of the NAND gates 301 and 302.

The 3-input AND gate 291 has first to third input terminals, the first input terminal connected to the input terminal 19, the second input terminal connected to receive the output Q of the D flipflop 22, and the third input terminal connected to receive the inverted output $\overline{Q}$ of the D flipflop 25. The AND gate 291 has its output connected to one input terminal of the NAND gate 301.

The AND gate 292 has one input terminal connected to receive the output Q of the D flipflop 25, its the other input terminal connected to the input terminal 19 through the inverter 27, and its output terminal connected to one input terminal of the NAND gate 302.

The NAND gate 301 has its output terminal connected to the switching circuit 111 (FIG. 1), and the NAND gate 302 has its output terminal connected to the switching circuit 112 (FIG. 1).

The operation of the pulse signal generating circuit 10 shown in FIG. 2 will be described.

First, a composite synchronizing signal which has been binarized by the comparator 9 is input to the input terminal 19. The composite synchronizing signal is delayed by the delay circuit 20 by the time t1 and applied to the delay circuit 23, as well as to the clock terminal CLK of the D flipflop 22 through the inverter 21. The delay circuit 23 further delays the composite synchronizing signal which has been delayed by time t1 by the delay circuit 20, by a small time period t2, and applies the signal to the clock terminal CLK of the D flipflop 25 through the inverter 24. The D fliplop 25 generates a pulse in response to the output from the inverter 24. The inverted output $\bar{Q}$ of the D flipflop 25 is applied to the delay circuit 26, and the delay circuit 26 delays the input pulse by the time t3 and applies the same to the clear terminals C of the D flipflops 22 and 25. The D flipflops 22 and 25 reset the output pulse in response to the signal input to the clear terminals C, and applies the same to the input terminals of the AND gates 291 and 292.

The AND gate 291 receives the composite synchronizing signal, the output Q of the D flipflop 22 and the inverted output $\bar{Q}$ of the D flipflop 25 at the three input terminals, respectively. Therefore, when the pulse width of the horizontal synchronizing signal is smaller than the reference time period, the AND gate 291 applies a positive pulse to the NAND gate 301.

The input composite synchronizing signal inverted by the inverter 27 and the output Q from the D flipflop 25 are input to the AND gate 292. Therefore, when the pulse width of the horizontal synchronizing signal is larger than the reference time period, the AND gate 292 applies a positive pulse to the NAND gate 302.

A signal from the vertical blanking period detecting circuit 28 (which is at the low level only during the vertical blanking period) is applied to one input terminal of each of the NAND gates 301 and 302, and the NAND gate 301 provide an AND of the positive pulse from the AND gate 291 and the signal from the vertical blanking period detecting circuit 28. Therefore, the positive pulse output from the AND gates 291 and 292 is turned to a negative pulse signal except in the vertical blanking period. The operation is therefore stopped during the vertical blanking period, since the composite synchronizing signal in this period, such as an equalizing pulse or the pulses with very small pulse width generated before and after the equalizing pulse, has different pulse width and periods from the common horizontal synchronizing pulse signal.

FIGS. 3 to 6 show timings of the various circuits in the pulse signal generating circuit 10 shown in FIG. 2. The reference characters a-m in these figures show the signal waveforms at respective portions denoted by a-m in FIG. 2.

FIG. 3 shows timings when the pulse width of the horizontal synchronizing signal in the input composite synchronizing signal is larger than t+t3, and FIG. 4 shows timings when the pulse width of the horizontal synchronizing signal in the input composite synchronizing signal is smaller than t−t2. If the pulse width of the horizontal synchronizing signal is larger than t+t3, the waveforms of various portions of the pulse signal generating circuit 10 shown in FIG. 2 are as shown by a−m of FIG. 3, and the AND gate 292 outputs a pulse signal of the waveform m of FIG. 3 (with the pulse width of t3).

When the pulse width of the horizontal synchronizing signal is smaller than t−t2, the waveforms of various portions of FIG. 2 are as shown by a−m of FIG. 4, and the AND gate 291 outputs a pulse signal of the waveform k (with the pulse width of t2) of FIG. 4.

FIG. 5 shows timings when the pulse width of the horizontal synchronizing signal in the input composite synchronizing signal is larger than the reference time period and smaller than t+t3. As shown in FIG. 5, the positive pulse width of the waveform m is narrower than the delay time t3, which corresponds to the difference between the reference time period and the pulse width of the horizontal synchronizing signal.

FIG. 6 shows timings when the pulse width of the horizontal synchronizing signal is smaller than the reference time period and larger than t−t2. In this case, the positive pulse width of the waveform k shown in FIG. 6 is narrower than the delay time t2 and corresponds to the difference between the reference time period and the pulse width of the horizontal synchronizing signal.

By the structure of the pulse signal generating circuit shown in FIG. 2, the charging/discharging operation of the integrating circuit in the succeeding stage can be controlled delicately even if the difference between the reference time period and the pulse width of the horizontal synchronizing signal is small, and as a result, accurate clamping operation becomes possible.

FIG. 7 is a diagram of signal waveforms illustrating the principle of correction loop of the threshold potential including the comparator 9. In a reproduced video signal of a VTR or the like, the edge portion of the synchronizing signal is moderate because of degradation of frequency characteristic or the like. Therefore, if the input composite video signal has such a waveform as shown in the upper portion of FIG. 7 and the threshold potential input to the negative input terminal of the comparator 9 is as shown by (A), the output from the comparator 9 will be as shown by (C). If the threshold potential is increased to (B), the output from the comparator 9 becomes as shown by (D) and the pulse width is widened. By correcting the threshold potential so that the pulse width of the horizontal synchronizing signal in the composite synchronizing signal from the comparator 9 becomes a constant value t, the DC level of the composite video signal and a prescribed level can be compared to provide only the synchronizing signal portion.

The operation of the defect detecting circuit 14, the switching circuit 13a and 13b, negative peak detecting circuit 15 and the adder 16 shown in FIG. 1 will be described. When a defect is detected from the content of the pulses of the composite synchronizing signal from the comparator 9, the defect detecting circuit 14 turns off the switching circuit 13a provided between the integrating circuit 12 and the comparator 9, and turns on the switching circuit 13b provided between the adder 16 and the negative input terminal of the comparator 9. The defect of the pulse content of the composite synchronizing signal means that the number of pulses is larger than the number of synchronizing pulse signals of the composite video signal, or failure of detection of the synchronizing pulse signal.

After the switching circuit 13a is turned off, the negative peak potential from the negative peak detecting circuit 15 and a prescribed positive potential Vp (not larger than the pulse amplitude of the synchronizing signal in the composite video signal) are added by the adder 16, and the added potential is input to the comparator 9 through the switching circuit 13b as the threshold potential. By this method, the state of defect is immediately resolved, and thereafter when abnormal state ends, the switching circuit 13b is turned off, the switching circuit 13a is turned on and the operation returns to the normal correction loop.

In this manner, the clamp circuit shown in FIG. 1 can immediately correct itself from the state of defect, and therefore accurate clamping operation is possible. Further, it can quickly transfer from the initial state at the time of power on or the like, to enter the correction loop.

The subtractor 17 subtracts the above mentioned threshold potential from the composite video signal. Consequently, a composite video signal with the DC level fixed (clamped) at a certain potential is provided. The clamped composite video signal is output from the output terminal 18.

FIG. 8 is a block diagram showing another embodiment of the present invention. The clamp circuit shown in FIG. 8 clamps a video signal including the three value synchronizing signal. The three value synchronizing signal includes a negative synchronizing pulse signal and a positive synchronizing pulse signal as shown in FIG. 21. The clamp circuit of FIG. 8 differs from the clamp circuit of FIG. 1 in that a circuit for making constant the pulse width of the negative synchronizing pulse, and a circuit for making constant the pulse width of the positive synchronizing pulse are provided. In addition, the clamp circuit of FIG. 8 includes an H window generating circuit 33 and an average value calculating circuit 41. The circuit for making constant the negative synchronizing pulse signal has a similar structure as the clamp circuit shown in FIG. 1. The circuit for making constant the synchronizing pulse signal of positive polarity includes a comparator 32, an inverter 34, a pulse signal generating circuit 35, switching circuits 361 and 362, an integrating circuit 37, a defect detecting circuit 39, an adder 40 and switching circuits 38a and 38b. The circuit for making constant the pulse width of the positive synchronizing pulse signal has the same structure and operates in the same manner as a circuit for making constant the negative synchronizing pulse signal, except that the signal treated is the synchronizing pulse signal of positive polarity.

The operation of the clamp circuit shown in FIG. 8 will be described.

A video signal including the three value synchronizing signal is input to the input terminal 8. Since this signal does not have a DC component, the DC level fluctuates dependent on the average video level. The comparator 9 for taking out only the negative synchronizing pulse signal portion of the video signal receives the video signal from the positive input terminal, receives a negative threshold potential, which will be described later, at a negative input terminal and detects only the synchronizing pulse signal portion of negative polarity. Then it outputs a binary negative synchronizing pulse signal. The method of generating the negative threshold potential is as follows. A pulse signal generating circuit 10 connected to the comparator 9 determines whether or not the pulse width of the binary negative synchronizing pulse signal detected by the comparator is larger than or smaller than a predetermined reference time period, and if the pulse width of the negative synchronizing pulse signal is smaller than the reference time period, it applies a negative pulse signal S1 to the switching circuit 111. Conversely, if the pulse width of the synchronizing pulse signal is larger than the reference time period, it applies a pulse signal S2 to the switching circuit 112. In response to the negative pulse signal S1 or S2, the switching circuit 111 or 112 is turned on and applies a positive constant potential +Vs or negative constant potential −Vs to the integrating circuit 12, respectively. The integrating circuit 12 integrates the positive constant potential +Vs and negative constant potential −Vs and generates a negative threshold potential. The negative threshold potential is applied to the negative input terminal of the comparator 9 and to the average value calculating circuit 41.

Similarly, the video signal including the three value synchronizing signal input through the input terminal 8 is input to the positive input terminal of the comparator 32 for taking out only the positive synchronizing pulse signal portion, and the positive threshold potential is input to the negative input terminal. Consequently, the comparator 32 detects only the positive synchronizing pulse signal portion, and outputs a binary positive synchronizing pulse signal.

The method of generating the positive threshold potential is as follows. Namely, the positive synchronizing pulse signal has its polarity inverted by an inverter 34 connected to the comparator 32 to be applied to the pulse signal generating circuit 35. The pulse signal generating circuit 35 determines whether the pulse width of the detected binary positive synchronizing pulse signal is larger than or smaller than a predetermined reference time period, and if the pulse width of the positive synchronizing pulse signal is larger than the reference time period, it applies a negative pulse signal S3 to the switching circuit 361. Conversely, if the pulse width of the positive synchronizing pulse signal is smaller than the reference time period, it applies a negative pulse signal S4 to the switching circuit 362. The switching circuits 361 and 362 output the positive constant potential +Vs and negative constant potential −Vs in the similar manner as the switching circuits 111 and 112. The integrating circuit 37 integrates the positive constant potential +Vs and the negative constant potential −Vs, generates a positive threshold potential, and applies the generated threshold potential to the negative input terminal of the comparator 32 and to the average value calculating circuit 41.

The mean value of the negative threshold potential and the positive threshold potential is calculated by the average value calculating circuit 41, and the calculated average value is applied to the subtractor 17 connected in the next stage. The subtractor 17 is supplied with the input video signal, and by subtracting the mean value of the two threshold potentials from the input video signal, it can clamp the video signal.

Now, the distortion at the receiving end of the transmitting path or at rising and falling edges of the negative synchronizing pulse signal and the positive synchronizing pulse signal of the reproduced video signal from VTR and the like can be regarded as similar. Therefore, the average value of the negative threshold potential and the positive threshold potential corresponds to the pedestal level of the input video signal (see FIG. 21), provided that the negative synchronizing pulse signal output from the comparator 9 and the pulse width of the positive synchronizing pulse signal output from the comparator 32 are controlled to have the same value t.

FIG. 9 shows an example of the H window generating circuit 33 of FIG. 8. Referring to FIG. 9, the H window generating circuit 33 includes one shot mulitvibrators 33a and 33b. The one shot multivibrator 33a has its input terminal B connected to receive an output from the comparator 32, its inverted input terminal $\overline{A}$ connected to the ground terminal, and its output terminal Q connected to the inverted input terminal $\overline{A}$ of the one shot multivibrator 33b. The width of the output pulse of the one shot multivibrator 33a is set by the resistor and capacitor connected to the supply voltage Vcc.

The one shot multivibrator 33b has its input terminal B connected to the supply voltage Vcc and its inverted output terminal $\overline{Q}$ connected to the pulse signal generating circuit.

FIG. 10 is a diagram of signal waveforms at various portions of the H window generating circuit shown in FIG. 9.

In FIG. 10, Co represents the output waveform of the comparator 32, F1 represents the output waveform of the output terminal Q of the one shot multivibrator 33a, and F2 is an output waveform of the inverted output terminal $\overline{Q}$ of the one shot multivibrator 33b.

The operation of the H window generating circuit shown in FIG. 9 will be described. First, the output Co of the comparator 32 is applied to the input terminal B of the one shot multivibrator 33a, and the one shot multivibrator 33a outputs a positive pulse signal F1 having the pulse width of T1 in response to the rise of the output Co from the comparator 32. The one shot multivibrator 33b outputs a negative pulse signal F2 having the pulse width of T2 in response to the fall of the signal F1. In this manner, the H window generating circuit 33 generates a signal F2 which attain low level only during the horizontal synchronizing signal period. This signal F2 is applied to the pulse signal generating circuits 10 and 35.

FIG. 11 is a block diagram of the pulse signal generating circuits 10 and 35 shown in FIG. 9. The pulse signal generating circuit shown in FIG. 11 differs from the pulse signal generating circuit of FIG. 2 in that (1) the vertical blanking period detecting circuit 28 is removed, (2) an OR gate 43 is provided between the synchronizing pulse signal input terminal 19 and the delay circuit 20, (3) instead of the 3-input AND gate 291 and the NAND gate 301, an NAND gate 44 is provided, and (4) instead of the AND gate 292 and the NAND gate 302 NAND gate 45 is provided. Other portions are the same as the circuits shown in FIG. 2, and denoted by the same reference characters.

The operation of the pulse signal generating circuit shown in FIG. 11 will be described.

First, a synchronizing pulse signal binarized by the comparators 9 and 32 is input to the input terminal 19. The signal F2 which is at the low level only during the horizontal synchronizing signal period is input from the H window generating circuit 33 to the input terminal 42. The OR gate 43 provides an OR of the synchronizing pulse signal and the signal F2. Consequently, from the video signal including the three value synchronizing signal, the video signal portion, the vertical synchronizing signal portion and the like are removed, and only the horizontal synchronizing signal portion is taken out. The taken horizontal synchronizing signal is delayed by t1 by the delay circuit 20, and branched into two directions. One of the branched signal is input through an inverter 21 to a clock terminal CLK of the D flipflop 22, and the other one is applied to the delay circuit 23. The delay circuit 23 provides a delay of a small time t2 to the signal from the delay circuit 20, and inputs this signal to the clock terminal CLK of the D flipflop 25 through an inverter 24.

There is such a relation as represented by t 32 t1+t2 between the reference time period t and the delay times t1 and t2. This relation is the same as that in the pulse signal generating circuit shown in FIG. 2. However, respective time periods differ dependent on the pulse width of the synchronizing pulse signal.

The signal output from the inverted output terminal $\overline{Q}$ of the D flipflop 25 is delayed by a small time period t3 by the delay circuit 26. The delayed signal is input to the clear terminal C of each of the D flipflops 22 and 25. The D flipflops 22 and 25 have their data input terminals D and preset terminals P connected to the supply voltage Vcc.

The NAND gate 44 is connected to the synchronizing pulse signal from the OR gate 43, the output terminal Q of the D flipflop 22 and the inverted output terminal $\overline{Q}$ of the D flipflop 25, and if the pulse width of the synchronizing pulse signal is smaller than the reference time period, a negative pulse signal S1 (and S3) is output from the output terminal 46.

To the input terminal of the NAND gate 45, the synchronizing pulse signal from the OR gate 43 and the output signal from the D flipflop 25 are input through the inverter 27, and if the pulse width of the synchronizing pulse signal is larger than the reference time period, a negative pulse signal S2 (and S4) is output from the output terminal 47.

FIGS. 12 to 15 are timing diagrams at various portions of the pulse signal generating circuit shown in FIG. 11. The reference characters a—m' in these figures show the signal waveforms at respective portions denoted by the reference characters a—m' in FIG. 11.

FIG. 12 shows timings when the pulse width of the synchronizing pulse signal is larger than t+t3. FIG. 13 shows timings when the pulse width of the synchronizing pulse signal is smaller than t—t2. In the example of FIG. 12, the waveforms at various portions of FIG. 11 are as shown by a—m' of FIG. 12, and a negative pulse signal S2 (and S4) having the pulse width of t3 having such a waveform as shown by m' of FIG. 12 is output from the output terminal 47. In the example of FIG. 13, the waveforms at various portions of FIG. 11 are as shown by a —m' of FIG. 13, and a negative pulse signal S1 (and S3) of the pulse width of t2 having such a waveform as shown by k' of FIG. 13 is output from the output terminal 48.

FIG. 14 shows timings when the pulse width of the synchronizing pulse signal is larger than the reference time period but smaller than t+t3. As shown in FIG. 14, the width of the negative pulse signal S2 (and S4) having the waveform of m' is narrower than t3, and the time difference between the reference time period and the pulse width of the synchronizing pulse signal corresponds to the pulse width of the output pulse signal S2 (and S4).

Similarly, FIG. 15 shows timings when the pulse width of the synchronizing pulse signal is smaller than the reference time period but larger than t−t2. In this case also, the pulse width of the negative pulse signal S1 (and S3) shown by the waveform of k' is narrower than t2, which corresponds to the time difference between the reference time period and the pulse width of the synchronizing pulse signal.

Since the pulse signal generating circuit 10 and 35 have such circuit structure, when the time difference between the reference time period and the pulse width of the synchronizing pulse signal is small, the charging-/discharging operation of the integrating circuit 12 and 37 of the succeeding stage can be controlled delicately, and as a result, very accurate clamping operation can be done.

The pulse signals S1–S4 generated in the above described manner are applied to the switching circuits 111, 112, 361 and 362. The switching circuits 111 and 112 are closed when the pulse signals S1 and S2 are negative, respectively, and the integrating circuit 12 is charged/discharged. The average potential provided by the integrated circuit 12 is used as the negative threshold potential of the comparator 9.

Similarly, switching circuits 361 and 362 are turned on when the pulse signals S3 and S4 are negative. Consequently, the integrating circuit 37 is charged/discharged. The average potential provided by the integrating circuit 37 is used as the positive threshold potential of the comparator 32.

FIG. 16 is a diagram of signal waveform showing the principle of the correction loop of the negative threshold potential including the comparator 9. The received waveform at the receiving end of the transmission path or the waveform of the video signal reproduced by VTR or the like is distorted compared with the original waveform because of degradation of frequency characteristic or amplitude characteristic. Therefore, the edge portion of the synchronizing signal becomes moderate. However, in case of the waveform of the input video signal such as shown by the upper portion of FIG. 16, when the negative threshold potential input to the negative input terminal of the comparator 9 is (A), the output from the comparator 9 will be as shown by (C). If the negative threshold potential is increased to (B), the output form the comparator 9 becomes as shown by (D), resulting in wider pulse width.

FIG. 17 is a diagram of signal waveforms showing the principle of the correction loop of the positive threshold potential including the comparator 32. In case of a waveform of the input video signal such as shown by the upper portion of FIG. 17, when the positive threshold potential input to the negative input terminal of the comparator 32 is as shown by (E), the output from the comparator 32 will be (G). If this positive threshold potential is lowered to (F), the output from the comparator 32 will be as shown by (H), resulting in wider pulse width.

In this manner, by correcting the threshold potential such that the width of the synchronizing pulse signals from the comparators 9 and 32 have the constant value t, the DC level of the video signal can be compared with a constant level, enabling extraction of only the synchronizing signal portion.

The operation of the defect detecting circuits 14 and 39, the negative peak detecting circuit 15 and so on shown in FIG. 8 will be described. The defect detecting circuit 14 operates in the similar manner as described with reference to the embodiment of FIG. 1 when a defect is found from the contents of the negative synchronizing pulse signal from the comparator 9, so as to go out of the state of defect. In this case, the threshold potential is provided by adding a certain positive constant potential +Vp1 (smaller than the pulse amplitude of the negative synchronizing pulse signal of the video signal) to the negative peak potential by the adder 16, and the added potential is input to the negative input terminal of the comparator 9 through the switching circuit 13b.

Similarly, the defect detecting circuit 39 turns off the switching circuit 38a provided between the integrating circuit 37 and the comparator 32, adds a prescribed positive potential +Vp2 (larger than the pulse amplitude of the negative synchronizing pulse signal of the video signal, not lower than the sum of the pulse amplitude of the negative synchronizing pulse signal and the pulse amplitude of the positive synchronizing pulse signal) to the negative peak potential from the negative peak detecting circuit 15 of the video signal by an adder 40, and applies the added potential to the negative input terminal of the comparator 32 through the switching circuit 38b, when a defect is found from the content of the positive synchronizing pulse signal from the comparator 32.

In this method, the clamp circuit of FIG. 8 quickly goes out from the state of defect, and thereafter, when the state of defect is eliminated, the switching circuits 13 and 38 are switched to return to the normal correction loop. In addition, the clamp circuit can quickly go out from the initial state at the time of power on or the like to enter the correction loop.

The positive and negative two threshold potentials described above are input to the average value calculating circuit 41 to find an average value, and this value is subtracted from the input video signal by the subtractor 17 of the succeeding stage. Consequently, a video signal having the DC level (pedestal level) clamped at a certain potential can be provided. The clamped video signal is output from the output terminal 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clamp circuit for clamping a DC level of a composite video signal at a certain potential, comprising:
   synchronizing signal detecting means having at least two input nodes and one output node, for comparing said composite video signal applied to one input node with a threshold potential at the other input node to detect a synchronizing signal included in said composite video signal;
   pulse signal generating means, having a reference time period set therein to make constant a pulse width of a horizontal synchronizing signal, for generating a first pulse signal when the pulse width of said synchronizing signal detected by said synchronizing signal detecting means is larger than said reference time period and a second pulse signal when the pulse width of said synchronizing signal is smaller than said reference time period;
   threshold potential generating means, responsive to said first or second pulse signal, for generating said threshold potential and feeding back said threshold potential to said other input node of said synchronizing signal detecting means; and level fixing means, receiving said composite video signal and said threshold potential, for fixing the DC level of the composite video signal at said certain potential.

2. The clamp circuit according to claim 1, wherein said pulse signal generating means comprises:
   determining means for determining a maximum pulse width of said first pulse signal and a maximum pulse width of said second pulse signal; and
   output means for outputting said first and second pulse signals of said maximum pulse widths when a difference between the pulse width of said synchronizing signal detected by said synchronizing signal detecting means and said reference time period exceeds a respective one of said maximum pulse widths and for outputting said first and second pulse signals as corresponding to the difference between the pulse width of said synchronizing signal and said reference time period when the difference does not exceed a respective one of said maximum pulse widths.

3. The clamp circuit according to claim 2, wherein said determining means comprises:
   first delay means for delaying said synchronizing signal detected by said synchronizing signal detecting means by a first delay time;
   second delay means for delaying said synchronizing signal delayed by said first delay means by a second delay time corresponding to said maximum pulse width of said first pulse signal; and
   third delay means for delaying said synchronizing signal delayed by said second delay means by a third delay time corresponding to said maximum pulse width of said second pulse signal,
   a total of said first and second delay times corresponding to said reference time period.

4. The clamp circuit according to claim 2, wherein said output means comprises:
   first pulse means for generating a first pulse time signal corresponding to a total time of said maximum pulse width of said first pulse signal and said maximum pulse width of said second pulse signal;
   second pulse means for generating a second pulse time signal having said maximum pulse width of said second pulse signal;
   first gate means for providing a logical product of said synchronizing signal detected by said synchronizing signal detecting means, said first pulse time signal and said second pulse time signal and for generating said second pulse signal; and
   second gate means for providing a logical product of said second pulse time signal and said synchronizing signal detected by said synchronizing signal detecting means and for generating said first pulse signal.

5. The clamp circuit according to claim 2, wherein said pulse signal generating means further comprises:
   means for stopping output of said first and second pulse signals when a vertical synchronizing signal is output from said synchronizing signal detecting means.

6. The clamp circuit according to claim 1, wherein said threshold potential generating means comprises:
   first switching means having one end connected to a positive supply potential and being turned on/off in response to said second pulse signal;
   second switching means having one end connected to a negative supply potential and a second end coupled to a second end of said first switching means, and being turned on/off in response to said first pulse signal; and
   integrating means for integrating a signal output from said first and second switching means to generate said threshold potential.

7. A clamp circuit for clamping a DC level of a composite video signal at a certain potential, comprising:
   synchronizing signal detecting means having at least two input nodes and one output node, for comparing said composite video signal applied to one input node with a threshold potential at the other input node, to detect a synchronizing signal included in said composite video signal;
   pulse signal generating means, having a reference time period set therein to make constant a pulse width of a horizontal synchronizing signal, for generating a first pulse signal when the pulse width of said synchronizing signal detected by said synchronizing signal detecting means is larger than said reference time period and for generating a second pulse signal when the pulse width of said synchronizing signal is smaller than said reference time period;
   threshold potential generating means, responsive to said first or second pulse signal, for generating said threshold potential and for feeding back said threshold potential to said other input node of said synchronizing signal detecting means;
   level fixing means, receiving said composite video signal and said threshold potential, for fixing the DC level of the composite video signal at said certain potential;
   level detect means for detecting a lowest level of said composite video signal;
   defect detecting means for detecting a defect of said synchronizing signal detected by said synchronizing signal detecting means; and
   means for temporarily lowering the DC level of said composite video signal to said lowest level in response to a defect detecting signal output from said defect detecting means.

8. A clamp circuit for clamping a DC level of a video signal having a three value synchronizing signal including a synchronizing pulse signal of positive polarity and a synchronizing pulse signal of negative polarity at a certain potential, comprising:
   first synchronizing signal detecting means having at least two input nodes and one output node for comparing said video signal applied to one input node with a first threshold potential at the other input node to detect a synchronizing pulse signal of negative polarity included in said video signal;
   negative pulse signal generating means, having a first reference time period set therein to make constant a pulse width of said synchronizing pulse signal of negative polarity, for generating a first pulse signal when the pulse width of said synchronizing pulse signal of negative polarity detected by said first synchronizing signal detecting means is larger than said first reference time period, and for generating a second pulse signal when the pulse width of said synchronizing pulse signal of negative polarity is smaller than said first reference time period;
   first threshold potential generating means, responsive to said first or second pulse signal generated by said negative pulse signal generating means, for generating said first threshold potential and for feeding back said first threshold potential to the other input node of said first synchronizing signal detecting means;

second synchronizing signal detecting means having at least two input nodes and one output node for comparing said video signal applied to one input node with a second threshold potential at the other input node to detect a synchronizing pulse signal of positive polarity included in said video signal;

positive pulse signal generating means, having a second reference time period set for making constant a pulse width of said synchronizing pulse signal of positive polarity, for generating a third pulse signal when the pulse width of said synchronizing pulse signal of positive polarity detected by said second synchronizing signal detecting means is larger than said second reference time period, and for generating a fourth pulse signal when the pulse width of said synchronizing pulse signal of positive polarity is smaller than said second reference time period;

second threshold potential generating means, responsive to said third or fourth pulse signal generated by said positive pulse signal generating means, for generating said second threshold potential and for feeding back said second threshold potential to the other input node of said second synchronizing signal detecting means; and level fixing means, receiving said first and second threshold potentials and said video signal, for fixing the DC level of said video signal including said three value synchronizing signal at said certain potential.

9. The clamp circuit according to claim 8, wherein said negative pulse signal generating means comprises:

first determining means for determining a maximum pulse width of said first pulse signal and a maximum pulse width of said second pulse signal; and first output means for outputting said first and second pulse signals of said maximum pulse widths when a difference between the pulse width of said synchronizing pulse signal of negative polarity detected by said first synchronizing signal detecting means and said first reference time period exceeds a respective one of said maximum pulse widths and for outputting said first and second pulse signals as corresponding to the difference between the pulse width of said synchronizing pulse signal of negative polarity and said first reference time period when the difference does not exceed a respective one of said maximum pulse widths, said positive pulse signal generating means comprising second determining means for determining a maximum pulse width of said third pulse signal and a maximum pulse width of said fourth pulse signal; and second output means for outputting said third and fourth pulse signals of said maximum pulse widths when a difference between the pulse width of said synchronizing pulse signal of positive polarity detected by said second synchronizing signal detecting means and said second reference time period exceeds a respective one of said maximum pulse widths and for outputting said third and fourth pulse signals as corresponding to the difference between the pulse width of said synchronizing pulse signal of positive polarity and said second reference time period when the difference does not exceed a respective one of said maximum pulse widths.

10. A method of clamping a DC level of a composite video signal at a certain potential comprising the steps of:

comparing the composite video signal with a threshold potential to detect a synchronizing signal included in the composite video signal;

generating a first pulse signal when a pulse width of the synchronizing signal is larger than a reference time period, which is set to make constant a pulse width of a horizontal synchronizing signal included in the composite video signal, and a second pulse signal when the pulse width of the synchronizing signal is smaller than the reference time period;

generating the threshold potential in accordance with the first and second pulse signals; and fixing the DC level of the composite video signal at the certain potential in accordance with the threshold potential.

11. The method of clamping of claim 10, wherein said step of generating the first and second pulse signals comprises:

determining a maximum pulse width of the first pulse signal and a maximum pulse width of the second pulse signal;

outputting one of the first and second pulse signals of the maximum pulse widths when a difference between the pulse width of the synchronizing signal and the reference time period exceeds a respective one of the maximum pulse widths; and outputting the first and second pulse signals as corresponding to the difference between the pulse width of the synchronizing signal and the reference time period when the difference does not exceed a respective one of the maximum pulse widths.

12. The method of clamping of claim 11, wherein said step of determining comprises:

delaying the synchronizing signal by a first delay time;

delaying the synchronizing signal delayed by the first delay time by a second delay time corresponding to the maximum pulse width of the first pulse signal; and delaying the synchronizing signal delayed by the second delay time by a third delay time corresponding to the maximum pulse width of the second pulse signal, a total of the first and second delay times corresponding to the reference time period.

13. The method of clamping of claim 11, wherein said steps of outputting comprise:

generating a first pulse time signal corresponding to a total time of the maximum pulse width of the first pulse signal and the maximum pulse width of the second pulse signal;

generating a second pulse time signal having the maximum pulse width of the second pulse signal;

generating a logical product of the synchronizing signal, the first pulse time signal and the second pulse time signal as the second pulse signal; and generating a logical product of the second pulse time signal and the synchronizing signal as the first pulse signal.

14. The method of clamping of claim 11, wherein said step of generating the first and second pulse signals further comprises:

stopping output of the first and second pulse signals when a vertical synchronizing signal is detected as included in the composite video signal during said step of comparing.

15. The method of clamping of claim 10, wherein said step of generating the threshold potential comprises:
generating a positive supply potential in response to receipt of the second pulse signal;
generating a negative supply potential in response to receipt of the first pulse signal; and
integrating the positive and negative supply potentials to generate the threshold potential.

16. A method of clamping a DC level of a composite video signal at a certain potential comprising the steps of:
comparing the composite video signal to a threshold potential to detect a synchronizing signal included in the composite video signal;
generating a first pulse signal when the pulse width of the synchronizing signal is larger than a reference time period, which is set to make constant a pulse width of a horizontal signal included in the composite video signal, and a second pulse signal when the pulse width of the synchronizing signal is smaller than the reference time period;
generating the threshold potential in accordance with the first and second pulse signals;
fixing the DC level of the composite video signal at the certain potential in accordance with the threshold potential;
detecting a lowest level of the composite video signal;
detecting a defect of the synchronizing signal; and
temporarily lowering the DC level of the composite video signal to the lowest level in response to a detected defect.

17. A method of clamping a DC level of a video signal to a certain potential, the video signal having a three value synchronizing signal including a synchronizing pulse signal of positive polarity and a synchronizing pulse signal of negative polarity, the method of clamping comprising the steps of:
(a) comparing the video signal with a first threshold potential to detect a synchronizing pulse signal of negative polarity included in the video signal;
(b) generating a first pulse signal when the pulse width of the synchronizing pulse signal of negative polarity is larger than a first reference time period, which is set to make constant a pulse width of the synchronizing pulse signal of negative polarity, and a second pulse signal when the pulse width of the synchronizing pulse signal of negative polarity is smaller than the first reference time period;
(c) generating the first threshold potential in accordance with the first and second pulse signals;
(d) comparing the video signal with a second threshold potential to detect a synchronizing pulse signal of positive polarity included in the video signal;
(e) generating a third pulse signal when the pulse width of the synchronizing pulse signal of positive polarity is larger than a second reference time period, which is set to make constant a pulse width of the synchronizing pulse signal of positive polarity, and a fourth pulse signal when the pulse width of the synchronizing pulse signal of positive polarity is smaller than the second reference time period;
(f) generating the second threshold potential in accordance with the third and fourth pulse signals; and
(g) fixing the DC level of the video signal including the three value synchronizing signal at the certain potential in accordance with the first and second threshold potentials.

18. The method of clamping of claim 17, wherein said step (b) of generating the first and second pulse signals comprises:
determining a maximum pulse width of the first pulse signal and a maximum pulse width of the second pulse signal; and
outputting the first and second pulse signals of the maximum pulse widths when a difference between the pulse width of the synchronizing pulse signal of negative polarity and the first reference time period exceeds a respective one of the maximum pulse widths and the first and second pulse signals as corresponding to the difference between the pulse width of the synchronizing pulse signal of negative polarity and the first reference time period when the difference does not exceed a respective one of the maximum pulse widths, said step (e) of generating the third and fourth pulse signals comprising
determining a maximum pulse width of the third pulse signal and a maximum pulse width of the fourth pulse signal; and
outputting the third and fourth pulse signals of the maximum pulse widths when a difference between the pulse width of the synchronizing pulse signal of positive polarity and the second reference time period exceeds a respective one of the maximum pulse widths and the third and fourth pulse signals as corresponding to the difference between the pulse width of the synchronizing pulse signal of positive polarity and the second reference time period when the difference does not exceed a respective one of the maximum pulse widths.

* * * * *